United States Patent [19]
Isobe et al.

[11] Patent Number: 5,946,010
[45] Date of Patent: Aug. 31, 1999

[54] SERIAL COPIER, SCANNER, AND PRINTER EMPLOYING CONTINUOUS MEDIA TRANSPORT

[75] Inventors: Minoru Isobe; Noboru Otaki, both of Tokyo, Japan

[73] Assignee: Oki Data Corporation, Tokyo, Japan

[21] Appl. No.: 08/757,678

[22] Filed: Nov. 29, 1996

[30] Foreign Application Priority Data

Dec. 1, 1995 [JP] Japan .................................. 7-313956
Jul. 24, 1996 [JP] Japan .................................. 8-195035

[51] Int. Cl.⁶ .............................. B41J 23/00; B41J 2/385; H04N 1/21; H04N 1/23
[52] U.S. Cl. .............................. 347/37; 358/296; 347/117
[58] Field of Search ........................... 347/37, 2, 3, 130, 347/119, 117; 358/474, 296, 472, 496; 346/139

[56] References Cited

U.S. PATENT DOCUMENTS

| | | | |
|---|---|---|---|
| 4,509,058 | 4/1985 | Fischbeck | 347/3 |
| 4,540,996 | 9/1985 | Saito | 347/43 |
| 4,743,927 | 5/1988 | Sasaki | 347/130 |
| 4,920,421 | 4/1990 | Stemmle | 358/296 |
| 5,162,916 | 11/1992 | Stemmle et al. | 358/296 |
| 5,241,377 | 8/1993 | Kaneda | 358/58 |
| 5,369,480 | 11/1994 | Isobe | 355/320 |
| 5,391,867 | 2/1995 | Grumberg | 250/208.1 |

FOREIGN PATENT DOCUMENTS 2-29047  12/1990  Japan ..................................... 347/37
6-64246   3/1994  Japan .

*Primary Examiner*—N. Le
*Assistant Examiner*—Thinh Nguyen
*Attorney, Agent, or Firm*—Rabin & Champagne, P.C.

[57] ABSTRACT

A copier, scanner, or printer has serial scanning and/or printing heads. A uniform relative motion is maintained in a longitudinal direction between the head(s) and the scanning and/or printing media. The head(s) move cyclically back and forth at an acute angle to the longitudinal direction, so that each scanning element and/or each printing element scans or prints a pixel line perpendicular to the longitudinal direction. The acute angle and the rate of relative uniform motion are preferably adjustable according to the width of the area to be scanned or printed. For color copying, scanning, or printing, the scanning and/or printing elements are grouped according to color, and are aligned so that the same pixel lines are scanned or printed in different colors.

43 Claims, 25 Drawing Sheets

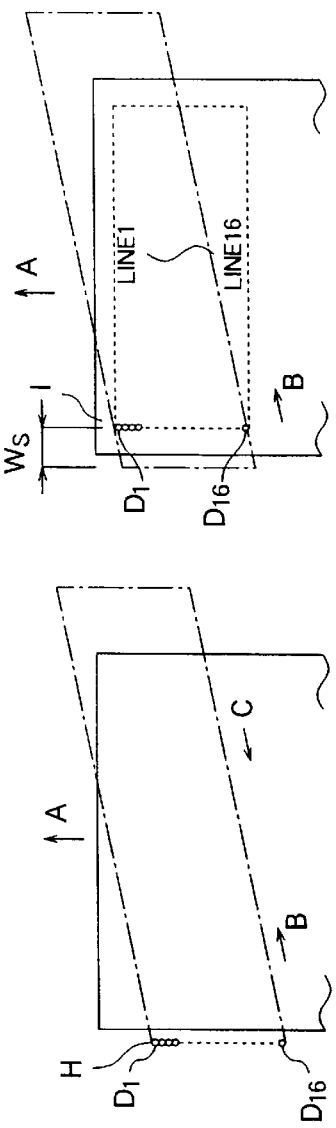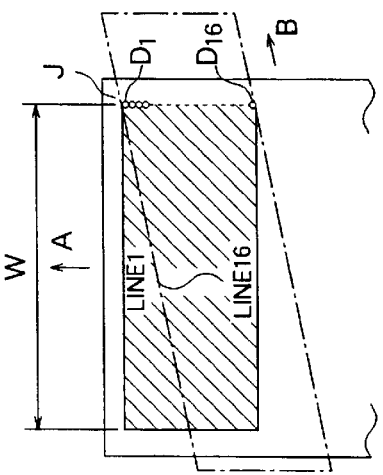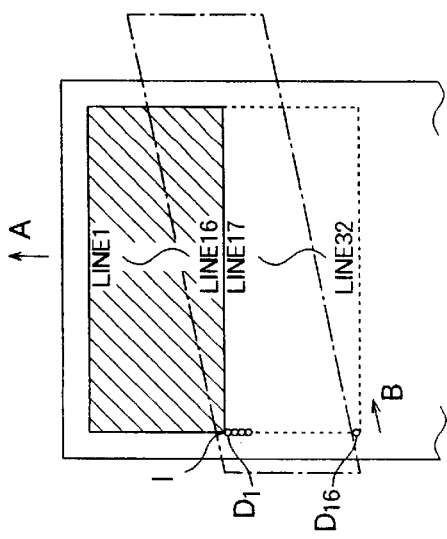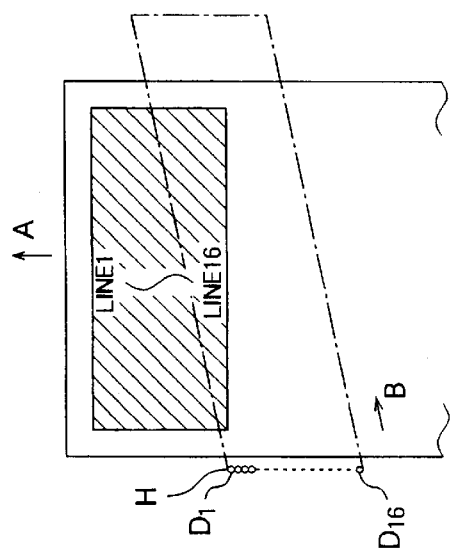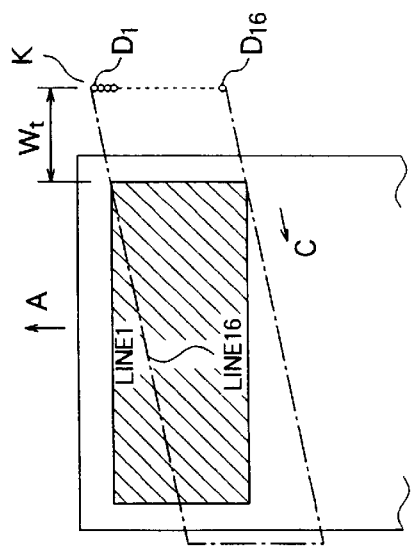
FIG. 8A  FIG. 8B  FIG. 8C  FIG. 8D  FIG. 8E  FIG. 8F

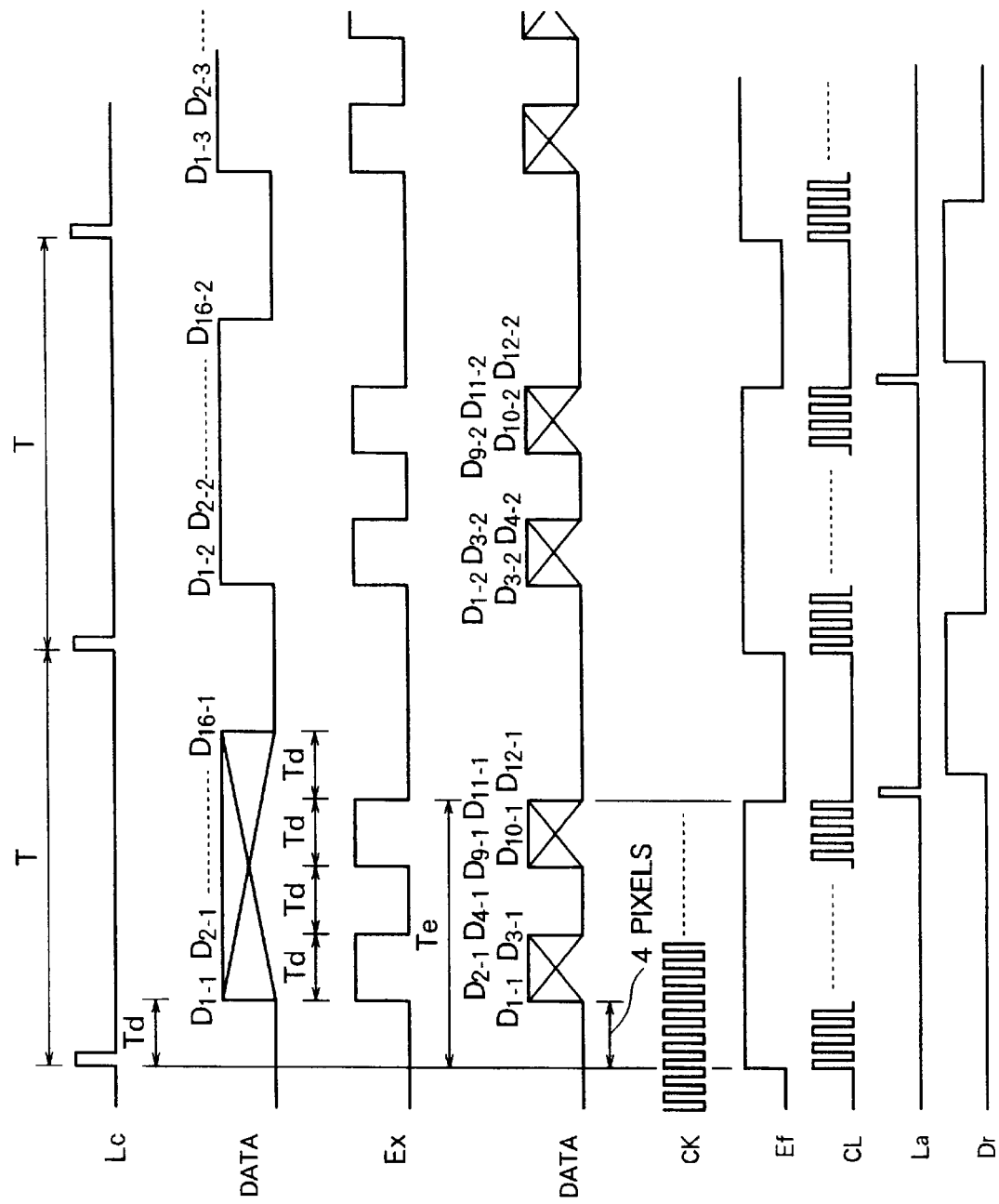

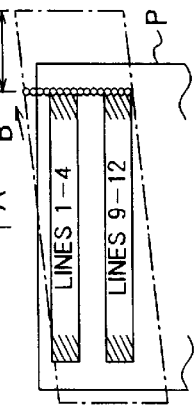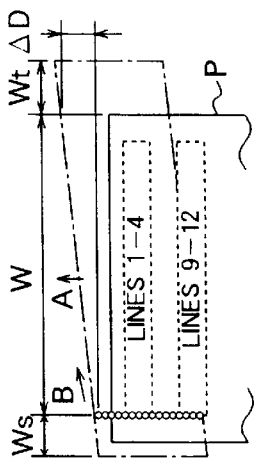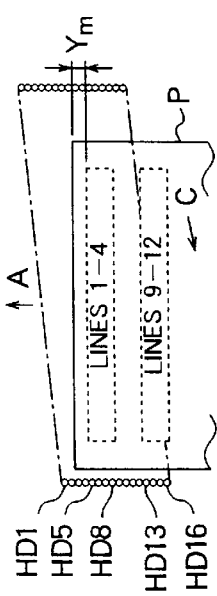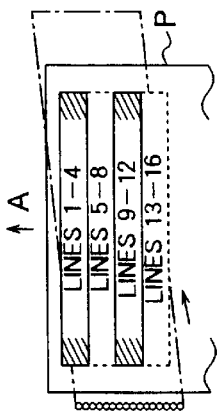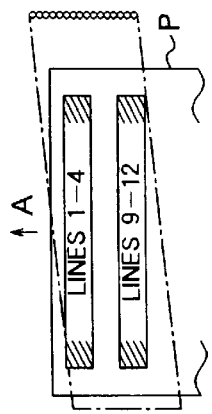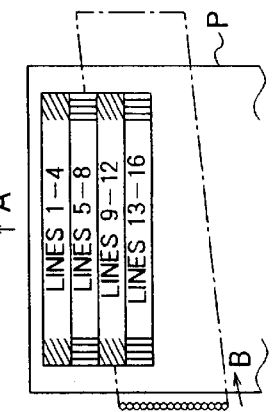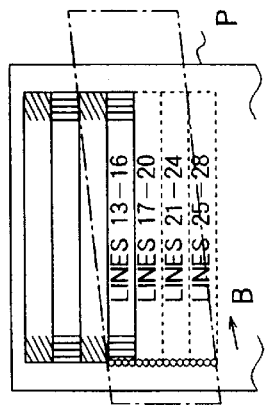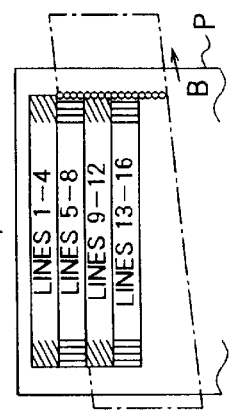

SERIAL COPIER, SCANNER, AND PRINTER EMPLOYING CONTINUOUS MEDIA TRANSPORT

BACKGROUND OF THE INVENTION

The present invention relates to a scanner employing a serial scanning head, a printer employing a serial printing head, and a copier employing a serial scanning head and a serial printing head.

A conventional copier of the above type copies an image from a document or other subject copy to a sheet of paper or other printing media as follows. The scanning head makes a transverse scan across the document, obtaining dot data for a certain number of pixel (picture-element) lines. The serial printing head makes a similar transverse scan across the paper, printing the pixels in those pixel lines or a previously scanned group of pixel lines. The document and paper are then advanced in the longitudinal direction, perpendicular to the transverse scanning direction, into position to scan and print the next group of pixel lines. Alternatively, the document and paper remain stationary and the scanning head and printing head are advanced in the longitudinal direction. The next group of pixel lines is scanned and printed after the longitudinal motion halts.

A problem that occurs in this type of copier is that the copy tends to have a banded appearance. If the paper or printing head does not move by exactly the right amount at each longitudinal advance, adjacent groups of pixel lines may overlap, or spaces may appear between the adjacent groups of pixel lines, so that transverse dark or light seams appear in the printed copy. These seams are readily visible and detract greatly from the appearance of the copy.

A known method of reducing the banded appearance causes adjacent groups of printed pixel lines to overlap intentionally, and prints only half of the pixels in the overlapping region during each transverse printing scan. If the overlapping region consists of one pixel line, for example, during each transverse printing scan, the even numbered pixels in the first pixel line and the odd-numbered pixels in the last pixel line can be printed. If the overlapping region is more than one pixel line wide, it can be printed in a checkerboard fashion.

This scheme does not entirely eliminate the banded appearance. Particularly in copies of dark images, misalignment of pixels in the overlapping regions creates a regular pattern of density variations and other printing defects that is still quite visible.

Similar defects appear when a computer-generated image, or an image read from an image file, is printed by a printer having a serial scanning head. Seams can also appear in images scanned by an image scanner having a serial scanning head, regardless of how the image is reproduced, if there are irregularities in the longitudinal motion between transverse scans.

SUMMARY OF THE INVENTION

It is accordingly an object of the present invention to scan, print, and copy documents and other subject matter by means of serial scanning and printing heads, without producing a seamed appearance.

The invented copier has a scanning head with a plurality of scanning elements, and a printing head with a plurality of printing elements. A media transport mechanism produces a uniform relative motion between the scanning head and a first medium in a first scanning direction, and a uniform relative motion between the printing head and a second medium in a first printing direction. A head transport mechanism moves the scanning head in a second scanning direction at an acute angle to the first scanning direction, and moves the printing head in a second printing direction at an acute angle to the first printing direction. The rates of motion are controlled so that each scanning element scans a pixel line perpendicular to the first scanning direction on the first medium, and each printing element prints a pixel line perpendicular to the first printing direction on the second medium.

For a color copier, the scanning elements are organized into a plurality of side-by-side groups, with an equal number of scanning elements in each group. The scanning elements in different groups scan different colors. Corresponding scanning elements in different groups are aligned in straight lines perpendicular to the first scanning direction, and therefore scan the same pixel lines. The printing elements are similarly organized into groups that print in different colors on the same pixel lines.

The scanning head and printing head are preferably supported by a single carriage, which is disposed between the first and second media. In this case the first scanning direction and first printing direction are the same, and the second scanning direction and second printing direction are the same. The carriage can be guided to move at the above-mentioned acute angle to the first scanning direction, or the carriage can move perpendicular to the first scanning direction. In the latter case, the scanning head and printing head are free to move in the first scanning direction relative to the carriage, and are pressed by springs against a guide shaft that defines the second scanning direction. The second scanning direction can be adjusted by moving the guide shaft, responsive to the width of the first medium.

The invented scanner is equivalent to the scanning part of the invented copier, and has a scanning head with a plurality of scanning elements. A media transport mechanism produces a uniform relative motion between the scanning head and a medium in a first direction. A head transport mechanism moves the scanning head in a second direction at an acute angle to the first direction, at a rate that causes each scanning element to scan a pixel line perpendicular to the first direction on the medium.

The invented printer has a printing head with printing elements organized into a plurality of groups. A media transport mechanism produces a uniform relative motion between the printing head and a medium in a first direction. A head transport mechanism moves the printing head in a second direction at an acute angle to the first direction at a rate that causes each printing element to print a pixel line perpendicular to the first direction on the medium. The printing elements in different groups print different colors. Corresponding printing elements in different groups are aligned in straight lines perpendicular to the first direction, and print the same pixel lines. The second direction is preferably adjustable. The printing head is preferably also capable of moving perpendicular to the first direction, for bidirectional printing.

BRIEF DESCRIPTION OF THE DRAWINGS

Embodiments of the invention will be described with reference to the attached illustrative drawings, in which:

FIGS. 8A, 8B, 8C, 8D, 8E, and 8F illustrate the relative motion of the scanning elements and subject copy;

FIGS. 16A and 16B are timing diagrams illustrating the operation of the printer in FIG. 15;

FIGS. 17A, 17B, 17C, 17D, 17E, 17F, 17G, 17H, and 17I illustrate interleaved printing by the printer in FIG. 15.

DETAILED DESCRIPTION OF THE INVENTION

First Embodiment

Figure 1:
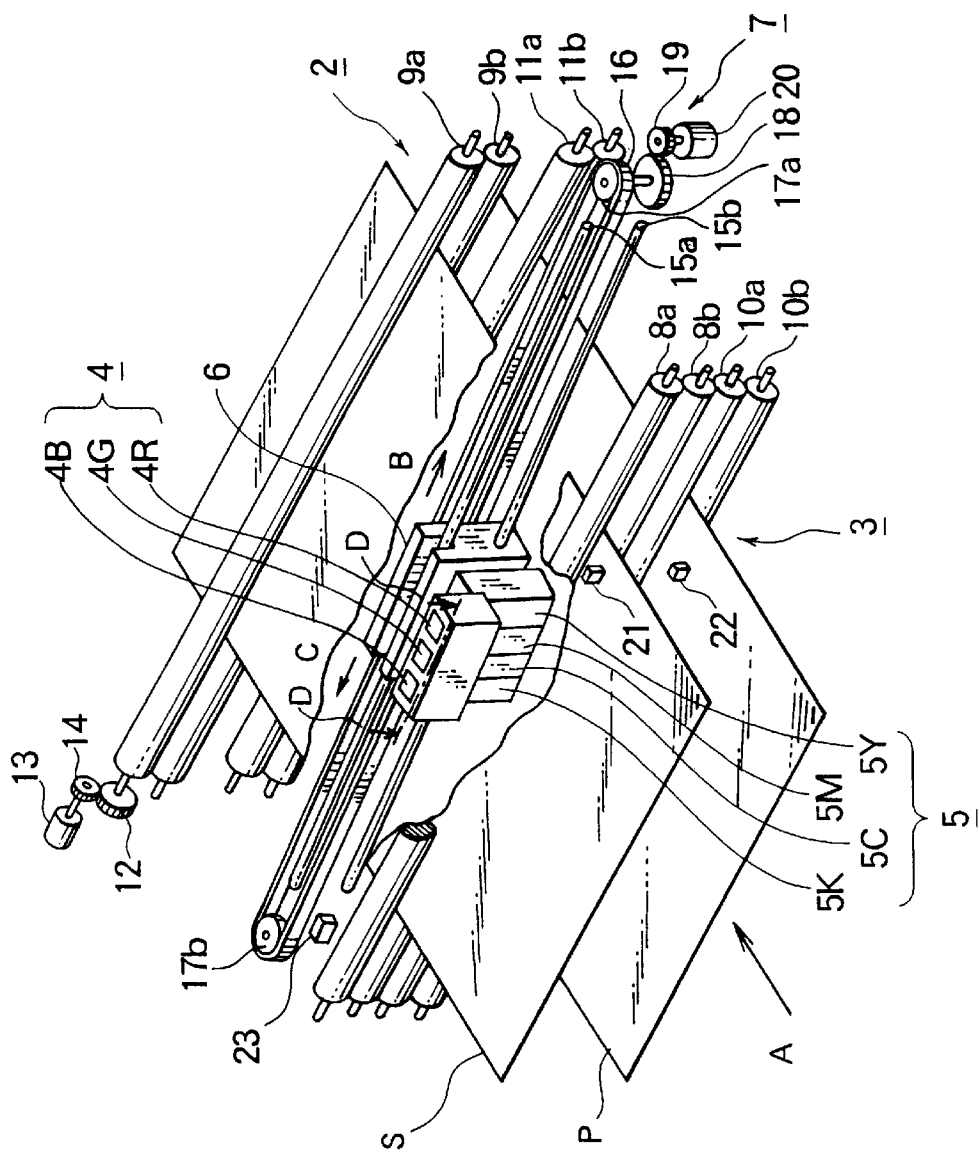
FIG. 1 is a perspective cutaway view of an embodiment of the invented copier.

FIG. 1 illustrates a copier having a first media transport mechanism 2 that transports a document or other subject copy S in the longitudinal direction of arrow A, a second media transport mechanism 3 that transports a sheet of paper or other printing medium P in the same direction A so that the subject copy S and printing medium P move in parallel planes, a scanning head 4 and a printing head 5 disposed between the first media transport mechanism 2 and second media transport mechanism 3, a carriage 6 on which the scanning head 4 and printing head 5 are mounted, and a head transport mechanism 7 that is aligned at an acute angle to the longitudinal direction A, and moves the carriage 6 in the direction of arrows B and C. An acute angle, by the way, is any angle greater than zero degrees but less than ninety degrees (less than a right angle). The acute angles mentioned in connection with this invention will normally be closer to ninety degrees than to zero degrees.

The first media transport mechanism 2 comprises a pair of transport rollers 8a and 8b and a pair of delivery rollers 9a and 9b. Similarly, the second media transport mechanism 3 comprises a pair of transport rollers 10a and 10b and a pair of delivery rollers 11a and 11b. A gear 12 is attached to one end of roller 9a, enabling roller 9a to be turned by a transport motor 13 that drives another gear 14, which engages gear 12. The transport motor 13 also drives rollers 8a, 8b, 9b, 10a, and 10b, by means of gears or belts not shown in the drawing. The subject copy S and printing medium P thus move together in the direction of arrow A.

Figure 2:
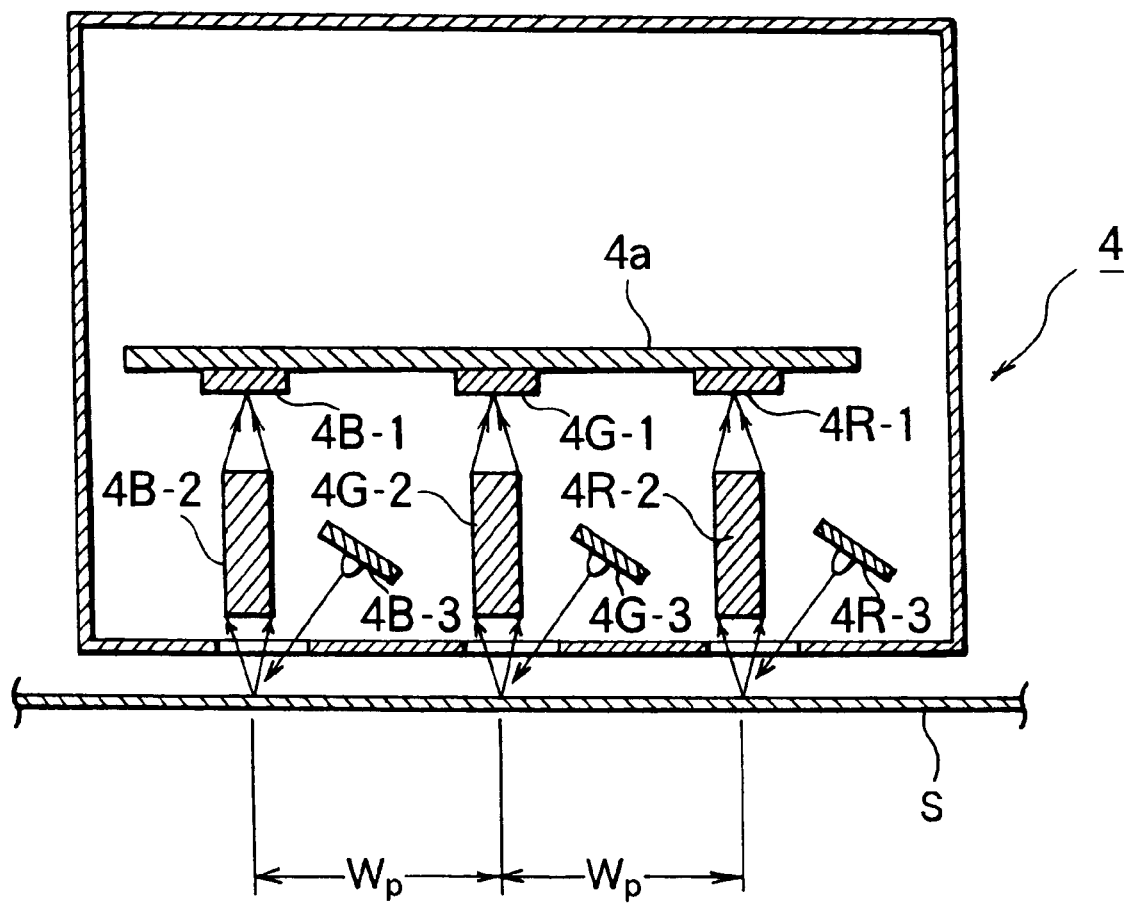
FIG. 2 is a sectional view through line D—D in FIG. 1.

The scanning head 4 has three contact-type scanning element groups 4R, 4G, and 4B disposed side-by-side in the transverse direction, perpendicular to the longitudinal direction A, which obtain pixel data for the colors red, green, and blue. Referring to FIG. 2 (in which the longitudinal direction is into the paper), the red scanning element group 4R comprises a photoelectric conversion element such as a CCD sensor 4R-1. (CCD stands for charge-coupled device.) The CCD sensor 4R-1 is an array of sensing elements disposed in a single line parallel to the longitudinal direction. A rod lens array 4R-2 is disposed between the CCD sensor 4R-1 and subject copy S. A red light source 4R-3 such as a light-emitting diode illuminates the subject copy S so that red light is reflected through the rod lens array 4R-2 to the CCD sensor 4R-1.

The green and blue scanning element groups 4G and 4B are similar in structure to the red scanning element group 4R, and their components are identified by the same reference symbols in FIG. 2, the letters G (green) and B (blue) being substituted for R (red). Light source 4G-3 emits green light, and light source 4B-3 emits blue light. The three scanning element groups 4R, 4G, and 4B are separated from one another by a distance equivalent to a certain number Wp of pixels. The three CCD sensors 4R-1, 4G-1, and 4B-1 are mounted on a printed circuit board 4a, which also has circuits (shown later) for processing the signals from the CCD sensors.

Referring again to FIG. 1, the printing head 5 is a color ink-jet printing head with four printing element groups 5Y, 5M, 5C, and 5K for printing in respective colors yellow (Y), magenta (M), cyan (C), and black (K). Aside from the use of different ink colors, all four printing elements groups 5Y, 5M, 5C, and 5K have the same structure. Each comprises a certain number of ink nozzles disposed in a line parallel to the longitudinal direction A, and means for expelling ink of the appropriate color through selectable nozzles. Well-known expelling means such as piezoelectric means or bubble-jet means may be employed.

In the following description it will be assumed that each scanning element group 4R, 4G, and 4B has sixteen scanning elements, and each printing element group 5Y, 5M, 5C, and 5K has sixteen printing elements. The invention is of course not limited to this number, but each group should normally have the same number of elements.

The head transport mechanism 7 comprises a parallel pair of guide shafts 15a and 15b that guide the movement of the carriage 6, a belt 16, the ends of which are attached to the carriage 6, a pair of pulleys 17a and 17b on which the belt 16 is wound, a driving gear 18 attached to pulley 17a, a motor gear 19 that engages the driving gear 18, and a so-called spacing motor 20. By turning pulley 17a and thus moving the belt 16, the spacing motor 20 moves the carriage 6 in the direction of arrows B and C.

The copier also has a pair of photosensors 21 and 22 disposed just in front of rollers 8a and 10a, respectively, to detect the presence of the subject copy S and printing medium P, and a photosensor 23 that detects the presence of the carriage 6 to determine when the scanning head 4 and printing head 5 are at their home position.

Figure 3:
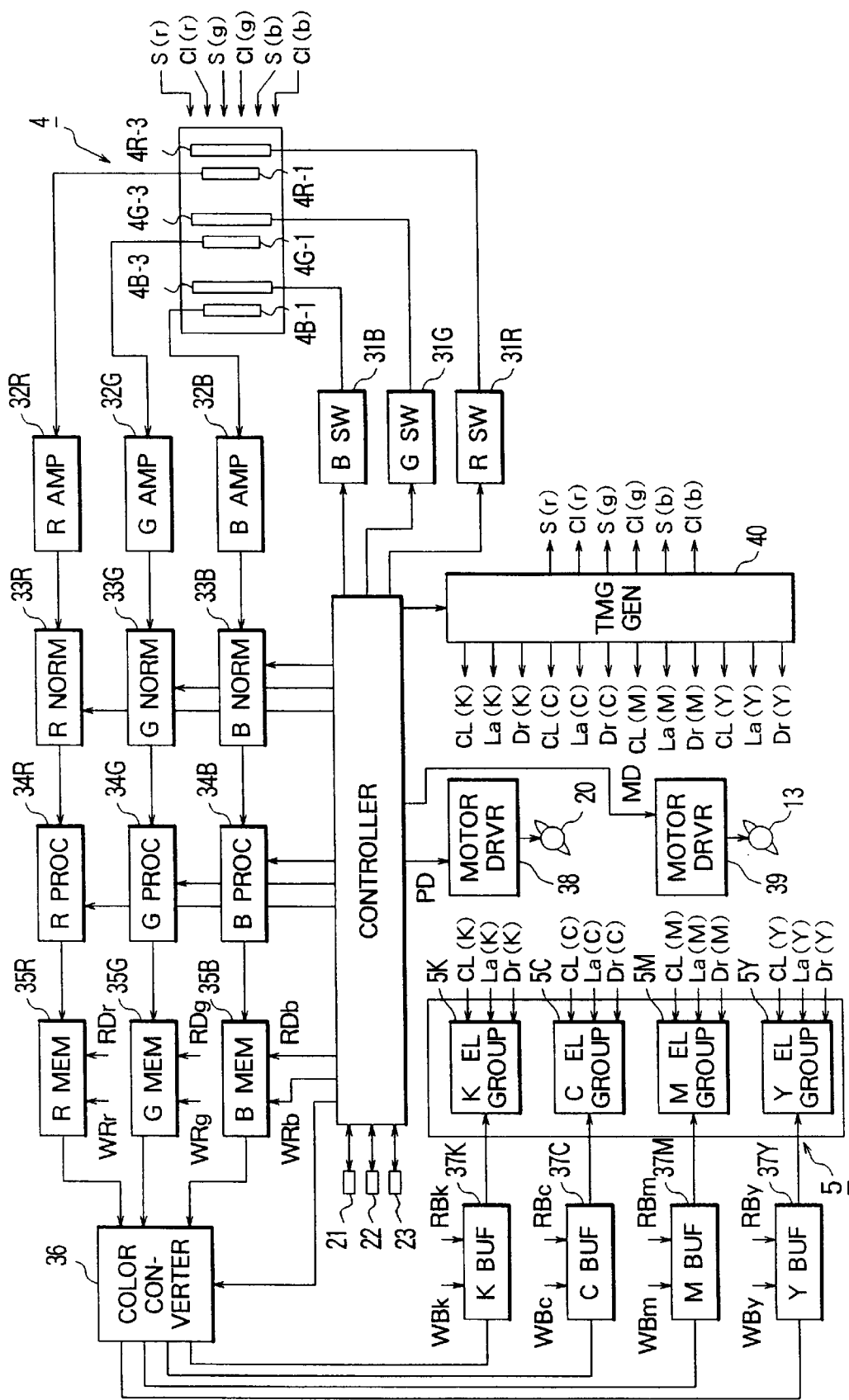
FIG. 3 is a block diagram of the control system of the copier in FIG. 1.

FIG. 3 is a block diagram of the control system of the copier in FIG. 1. The controller 30 is a device such as a microprocessor that controls all of the other circuits shown in the drawing. These circuits can conveniently be grouped by the colors red, green, blue, yellow, magenta, cyan, and black, which are denoted by the letters R, G, B, Y, M, C, and K as above. The description will start with the circuits that process the color red.

Switching circuit (SW) 31R switches the red light source 4R-3 on and off. Amplifier (AMP) 32R amplifies the signal from CCD sensor 4R-1. Normalizing circuit (NORM) 33R has an analog-to-digital converter, digital-to-analog converter, shading memory, and other well-known components that correct the amplified signal from the amplifier 32R to compensate for such factors as sensitivity differences between the individual scanning elements in CCD sensor 4R-1, the optical transmission characteristics of the rod lens array 4R-2, and illumination irregularities of the red light source 4R-3. Image processor (PROC) 34R compares the corrected signal from the normalizing circuit 33R with a threshold level to produce binary data. Alternatively, image processor 34R compares the corrected signal with a plurality of threshold levels to produce halftone data having a certain pixel depth representing a number of intensity levels, such as eight bits representing two hundred fifty-six intensity levels. The image processor 34R may also perform other well-known types of image processing, such as mirror reflection of the image. The resulting image data are written into a red data memory (MEM) 35R in synchronization with a write control signal WRr from the controller 30.

The green and blue signal processing circuits are similar to the red signal processing circuits, and have similar reference numerals with suffixes G and B. The green and blue write control signals are denoted WRg and WRb.

The data stored in the red, green, and blue data memories 35R, 35G, and 35B are read out in synchronization with read control signals RDr, RDg, and RDb from the controller 30 and processed by a color converter 36, which converts these data to yellow, magenta, cyan, and black printing data. The printing data are written into yellow, magenta, cyan, and black line buffers (BUF) 37Y, 37M, 37C, and 37K in synchronization with write control signals WBy, WBm, WBc, and WBk from the controller 30. From these line buffers, the data are supplied to the yellow, magenta, cyan, and black printing element (EL) groups 5Y, 5M, 5C, and 5K in the printing head 5, in synchronization with read control signals RBy, RBm, RBc, and RBk from the controller 30.

The motors 20 and 13 are controlled by a spacing motor driving circuit (DRVR) 38 and a transport motor driving circuit 39 in response to drive signals PD and MD from the controller 30. In addition, a timing generator (TMG GEN) 40 comprising programmable counter circuits and the like outputs the following signals: shift signals S(r), S(g), and S(b) and shift clock signals CL(r), CL(g), and CL(b) for the CCD sensors 4R-1, 4G-1, and 4B-1 in the scanning head 4; and pixel column clock signals CL(Y), CL(M), CL(C), and CL(K), latch signals La(Y), La(M), La(C), and La(K), and drive signals Dr(Y), Dr(M), Dr(C), and Dr(K) for the printing element groups 5Y, 5M, 5C, and 5K in the printing head 5.

Figure 4:
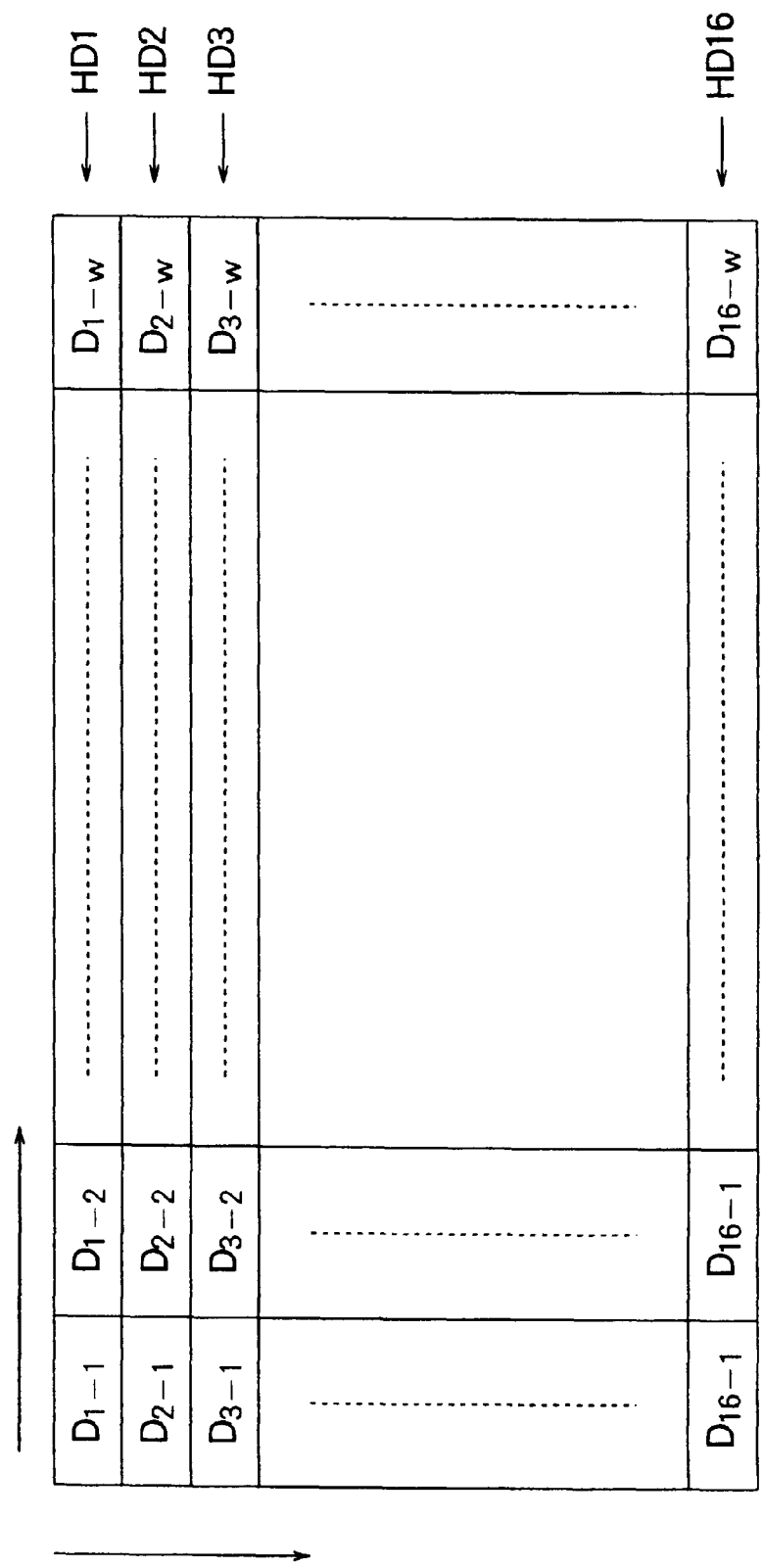
FIG. 4 illustrates the storage of data in a line buffer.

FIG. 4 illustrates the data structure in the line buffers 37Y, 37M, 37C, and 37K. Each line buffer stores sixteen lines of pixel data, with W pixels in each line (where W is a positive integer). That is, the line buffer stores data for W columns of sixteen pixels each. The pixel data for the m-th line address and n-th column address are denoted $D_{m-n}$ in the drawing (where m is an integer from 1 to 16 and n is an integer from 1 to W).

Figure 5:
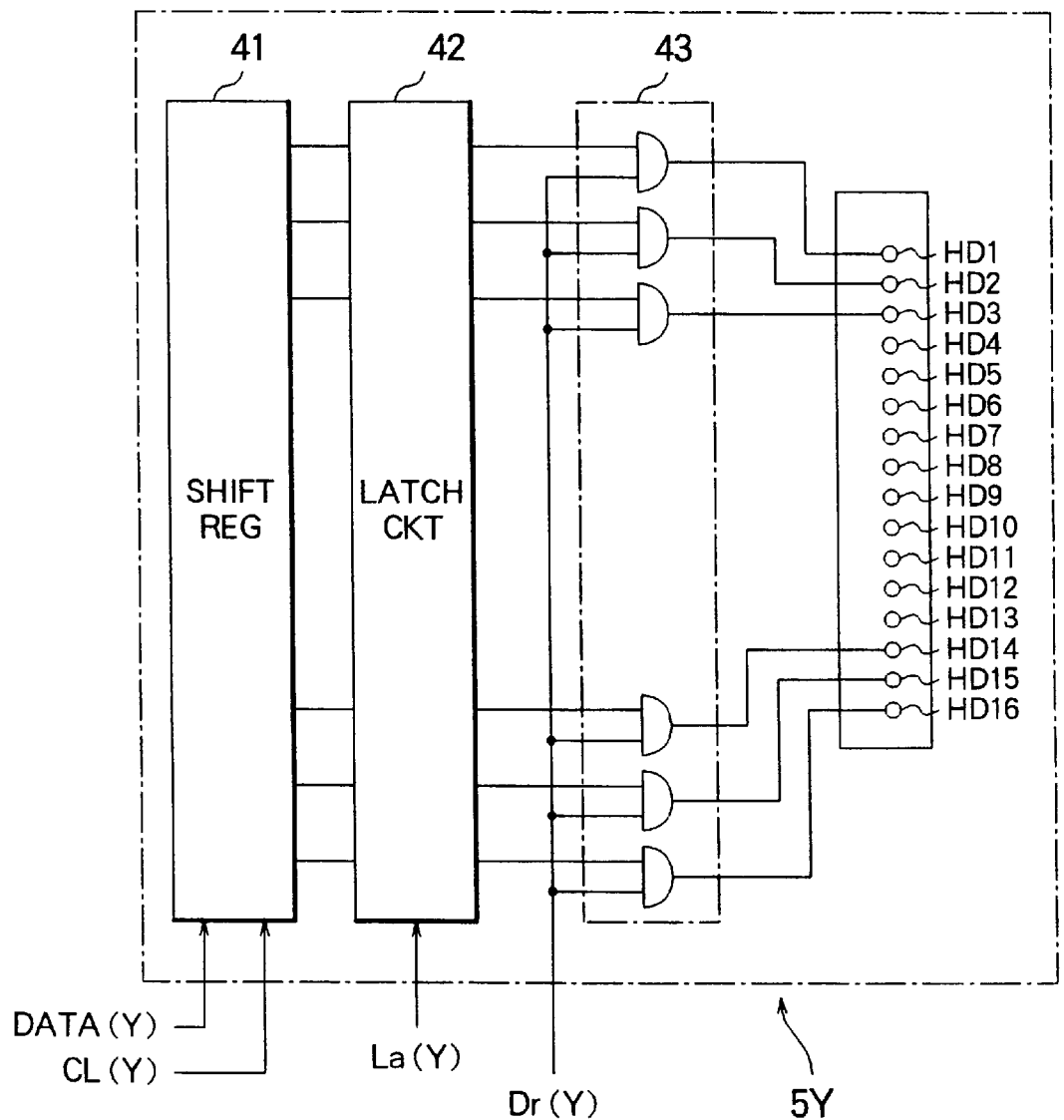
FIG. 5 illustrates a group of printing elements and their associated circuits.

FIG. 5 illustrates the structure of the printing element groups, taking the yellow printing element group 5Y as an example. The data from the yellow line buffer 37Y are transferred into a shift register (REG) 41 a column at a time in synchronization with pixel column clock signal CL(Y), and loaded into a latching circuit 42 in synchronization with latch signal La(Y). The data held in the latching circuit 42 are strobed by drive signal Dr(Y) by means of a set of AND gates 43, the outputs of which activate the expelling means mentioned earlier and cause drops of ink to be ejected from nozzles HD1 to HD16.

The operation of this embodiment will now be described with reference to FIGS. 6 to 9F. FIGS. 6 and 8A to 8F illustrate the scanning operation, while FIGS. 7 and 9A to 9F illustrate the printing operation.

Figure 6:
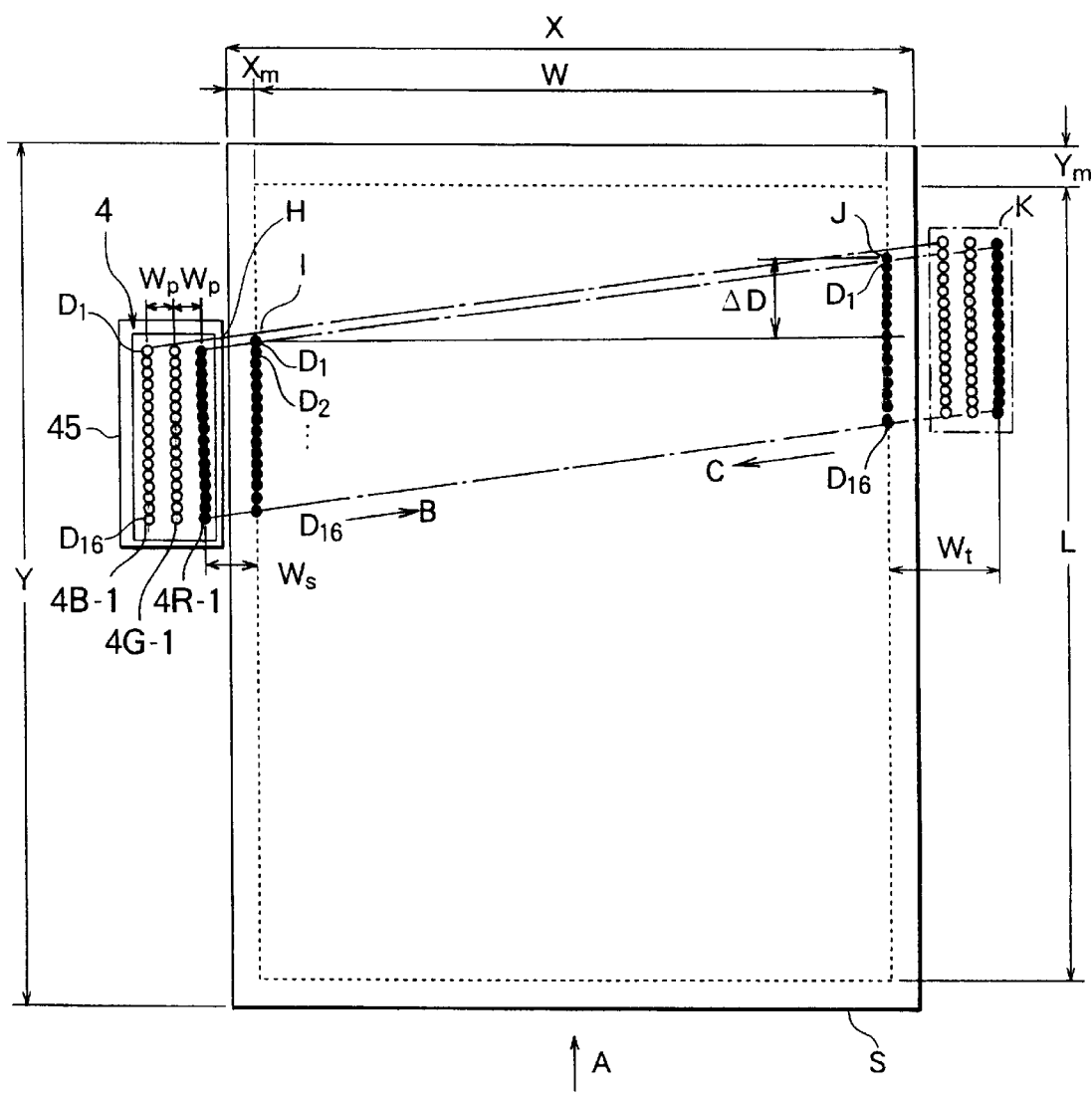
FIG. 6 illustrates the scanning of sixteen pixel lines.
Figure 7:
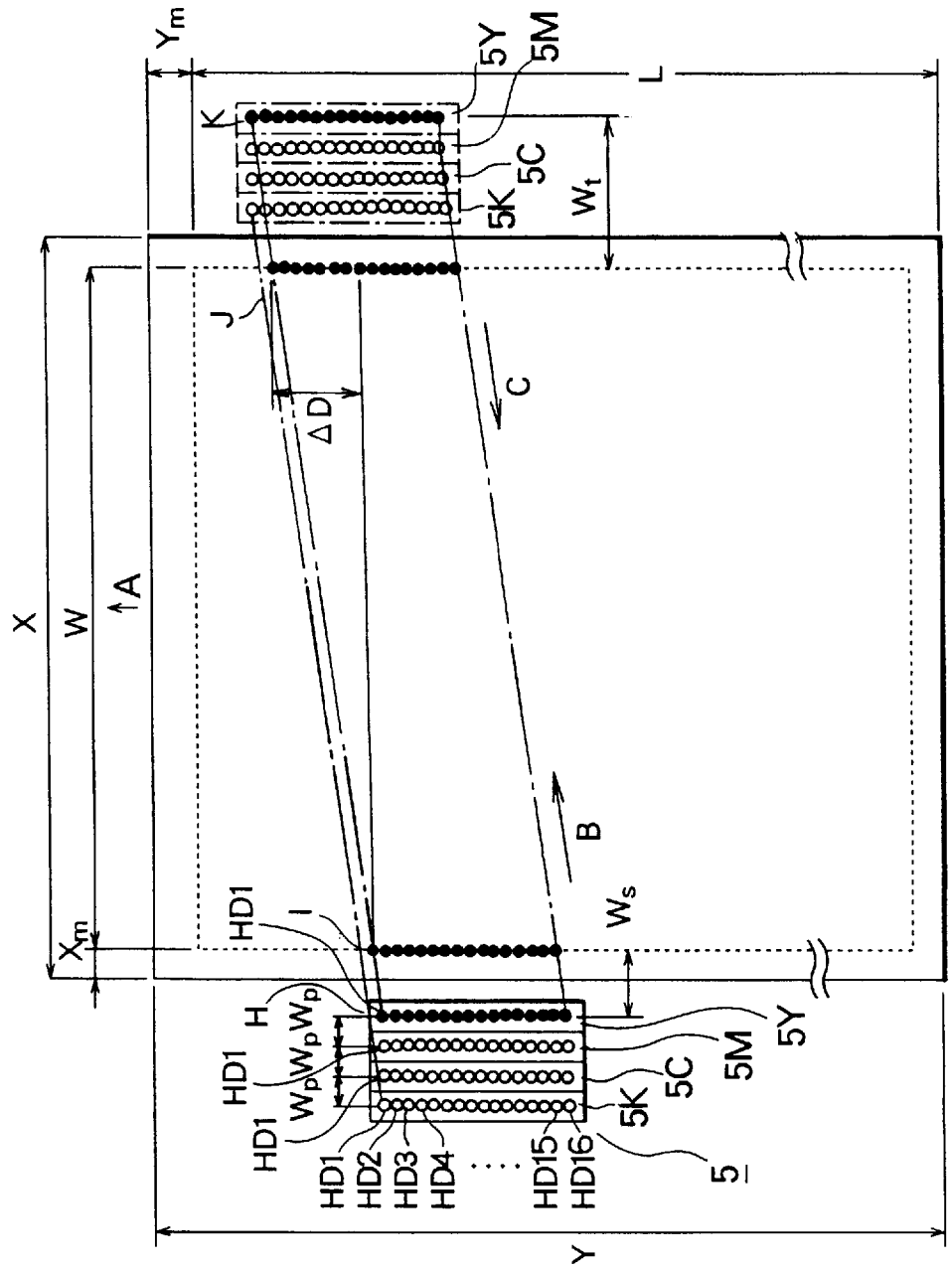
FIG. 7 illustrates the printing of sixteen pixel lines.
Figure 9A:
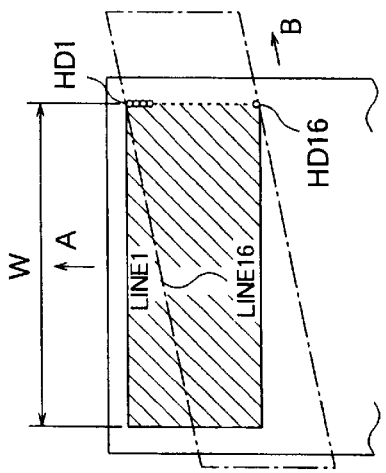
FIGS. 9A, 9B, 9C, 9D, 9E, and 9F illustrate the relative motion of the printing elements and printing medium.
Figure 9B:
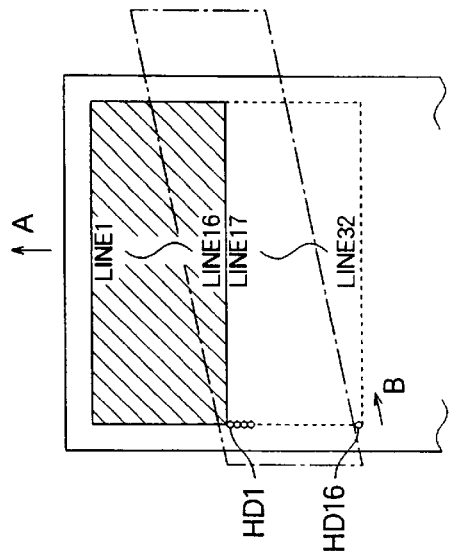
Figure 9C:
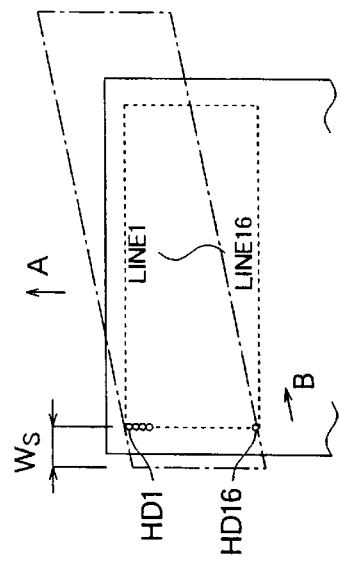
Figure 9D:
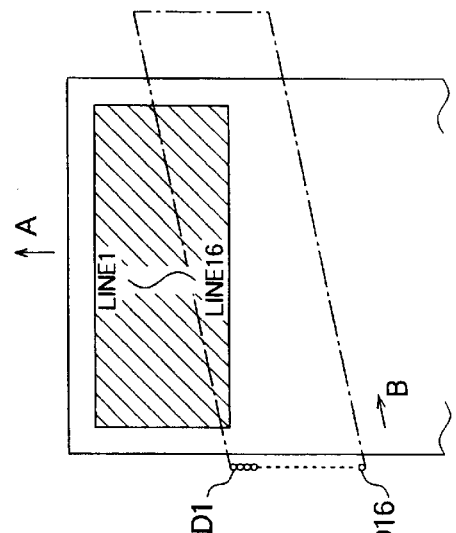
Figure 9E:
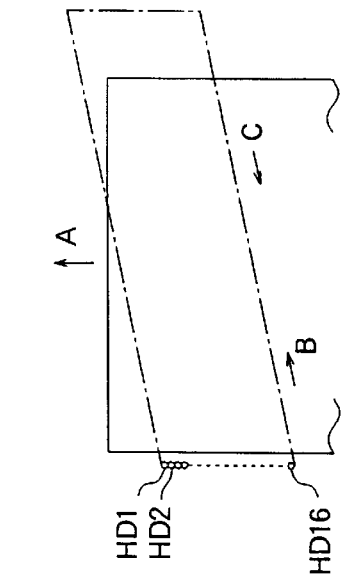
Figure 9F:
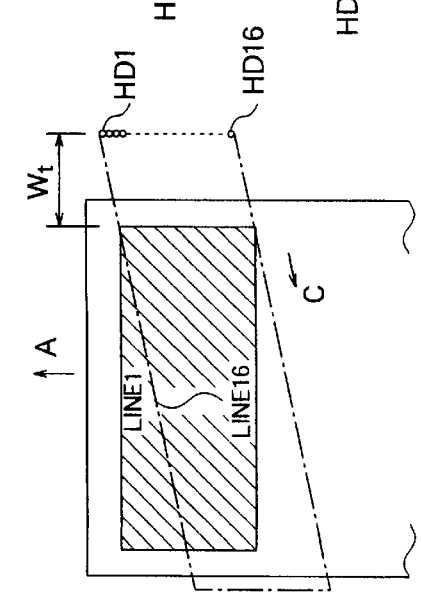

Referring to FIGS. 6 and 7, when the copier's power is switched on, the carriage 6 moves to the left and stops so that the scanning head 4 and printing head 5 are disposed at their home position H. Every copy operation starts with the scanning head 4 and printing head 5 at this home position.

Referring to FIG. 6, in its home position H, the scanning head 4 faces a white reference plate 45. When a copy button (not shown) is pressed, the controller 30 sends signals to the switching circuits 31R, 31G, and 31G that cause them to turn on the red, green, and blue light sources 4R-3, 4G-3, and 4B-3 in the scanning head 4. The light from the light sources is reflected from the white reference plate 45 and focused by the rod lens arrays onto the CCD sensors 4R-1, 4G-1, and 4B-1, generating photocharges. The controller 30 then commands the timing generator 40 to output shift signals and shift clock signals S(r), S(g), S(b), CL(r), CL(g), and CL(b), causing the photocharges to be read out of CCD sensors 4R-1, 4G-1, and 4B-1 and amplified by amplifiers 32R, 32G, and 32B, and corresponding data to be stored in the shading memories in normalizing circuit 33R, 33G, and 33B as white reference data.

Next, the controller 30 sends signals to a media feeding mechanism (not shown in the drawings), which feeds one sheet of the subject copy S and one sheet of the printing medium P to the transport rollers 8a, 8b, 10a, and 10b. When signals from photosensors 21 and 22 indicate that the subject copy S and printing medium P are in position, the controller 30 activates the transport motor drive signal MD, causing driving circuit 39 to drive the transport motor 13. This motor 13 turns the rollers 8a, 8b, 10a, and 10b at a uniform rate, advancing the subject copy S and printing medium P in the direction of arrow A.

When the subject copy S reaches a certain position, the controller 30 activates the spacing motor drive signal PD, causing driving circuit 38 to drive the spacing motor 20, which moves the carriage 6 in the direction of arrow B at a certain first rate. As CCD sensor 4R-1 begins to move across the subject copy S, red light reflected from the subject copy S generates signals which are read out of the CCD sensor and amplified as described above, and are processed in the normalizing circuit 33R with reference to the white reference data stored earlier. In this way, corrected signals are obtained from each of the scanning elements in CCD sensor 4R-1 (these scanning elements are denoted D1 to D16 in FIG. 6). The corrected signals are processed by the image processor 34R to produce red pixel data.

When the scanning head 4 has moved a distance equivalent to Ws pixel columns, the red CCD sensor 4R-1 is at position I, which is the start of the scanning area. At this position the controller 30 begins generating write control signals WRr, causing the red pixel data to be stored in the red data memory 35R. Output of these write signals continues until CCD sensor 4R-1 reaches position J. While traveling from position I to position J, the red CCD sensor 4R-1 scans a group of sixteen pixel lines on the subject copy S.

Similarly, the controller 30 begins generating green write control signals WRg when the green CCD sensor 4G-1 reaches position I, and blue write control signals WRb when the blue CCD sensor 4B-1 reaches position I, causing green and blue pixel data to be stored in the green and blue data memories 35G and 35B. Output of WRg signals begins when the scanning head 4 has moved a distance Ws+Wp from its home position. Output of WRb signals begins when the scanning head 4 has moved a distance Ws+2Wp from its home position. Output of WRg signals ceases when CCD sensor 4G-1 reaches position J. Output of WRb signals ceases when CCD sensor 4B-1 reaches position J.

The spacing motor 20 continues moving the carriage 6 in the direction of arrow B until read CCD sensor 4R-1 in the scanning head 4 reaches a stopping position K. The controller 30 then deactivates the PD signal, and the scanning head 4 stops at position K.

The total distance moved by the scanning head 4 in the transverse direction is Ws+W+Wt, where W is the width of the scanning area (indicated by dashed lines) between positions I and J, and Wt is the additional distance from position J to position K. The width W of the scanning area is less than the width X of the subject copy S, so scanning begins a distance Xm from the left edge of the subject copy S. The scanning area also has a length L less than the length Y of the subject copy S, so scanning begins a distance Ym from the leading edge of the subject copy S. Distances L, W, Ws, and Wt can be expressed in arbitrary units, but it is convenient to use pixel lines and columns as these units.

Since the head transport mechanism 7 is aligned at an acute angle to the direction of arrow A, while traveling across the width W of the scanning area columns on the subject copy S, the scanning head 4 moves in the direction of arrow A by a distance equivalent to $\Delta D$ pixel lines. The value of $\Delta D$ must be greater than zero, but less than the number N of lines scanned at once. In the present embodiment, N is sixteen and $\Delta D$ is eight.

The subject copy S continues to move at a uniform rate in the longitudinal direction of arrow A. The rates of motion of the subject copy S and scanning head 4 are controlled so that while the scanning head 4 moves from position I to position J, the subject copy S also travels by a distance equivalent to $\Delta D$ pixels in the direction of arrow A. Since the scanning head 4 and subject copy S move at the same rate in the direction of arrow A, the scanning head 4 stays even with the subject copy S in this direction. The pixel lines scanned by the CCD sensors 4R-1, 4G-1, and 4B-1 are therefore perpendicular to the longitudinal direction A.

The three CCD sensors 4R-1, 4G-1, and 4B-1 are disposed side-by-side so that corresponding scanning elements are aligned in the transverse direction, perpendicular to the longitudinal direction A. The three scanning elements D1 of CCD sensors 4R-1, 4G-1, and 4B-1, for example, are aligned in a straight line perpendicular to direction A. The three CCD sensors 4R-1, 4G-1, and 4B-1 therefore all scan the same pixel lines.

After stopping at position K, the scanning head 4 is moved in the direction of arrow C, back to its home position H, at a second rate faster than the rate of motion in the direction of arrow B. The controller 30 commands driving circuit 38 to turn the spacing motor 20 in reverse at the necessary speed. During this period of return motion, the controller 30 outputs read control signals RDr, RDg, and RDb, reading the pixel data from data memories 35R, 35G, and 35B into the color converter 36. If the image processors 34R, 34B, and 34G have not performed mirror reflection processing, the data are read in the reverse order to the order in which they were written, because the subject copy S is scanned face-down, while the printing medium P is face-up. The controller 30 also outputs buffer write control signals WBy, WBm, WBc, and WBk, and the color converter 36 writes corresponding yellow, magenta, cyan, and black pixel data in the line buffers 37Y, 37M, 37C, and 37K.

When the scanning head 4 reaches its home position H, it stops again; then the procedure described above is repeated to scan the next sixteen pixel lines. The speed of return travel and the length of the stopping times are controlled so that during one entire scanning cycle, beginning and ending at the same position, the subject copy S moves a distance equivalent to sixteen pixel lines in the direction of arrow A. The next group of sixteen pixel lines to be scanned thus begins immediately after the first group of sixteen pixel lines.

This is shown in FIGS. 8A to 8F, which illustrate the movement of both the scanning head 4 and the subject copy S. In FIG. 8A, the red CCD sensor 4R-1 is at its home position H. In FIG. 8B, CCD sensor 4R-1 has moved in the direction of arrow B to position I, and the subject copy S has moved in the direction of arrow A so that the CCD sensor 4R-1 is in position to begin scanning the first sixteen pixel lines in the scanning area. In FIG. 8C, the CCD sensor 4R-1 has reached position J and the subject copy S has moved farther in the direction of arrow A; the CCD sensor 4R-1 is just completing the scanning of the first sixteen pixel lines. The scanned pixel lines are indicated by hatching.

In FIG. 8D, the CCD sensor 4R-1 moves to its stopping position K. In FIG. 8E, the CCD sensor 4R-1 has returned in the direction of arrow C to its home position H. In FIG. 8F, the CCD sensor 4R-1 has reached position I again, and is in just the right position to begin scanning the next sixteen pixel lines (lines seventeen to thirty-two).

While these next sixteen pixel lines are being scanned, the first sixteen pixel lines are being printed. Referring to FIG. 7, the printing head 5 scans the printing medium P in the same way that the scanning head 4 scans the subject copy S. The letters X and Y now denote the dimensions of the printing medium P. The printing head 5 and scanning head 4 move together, so the dimensions W and L of the printed area on the printing medium P, the distance Ws from the home position H to the print starting position I, and the distance Wt from the print ending position J to the stopping position K are the same as in FIG. 6. While each printing element group 5Y, 5M, 5C, and 5K moves from I to J, the printing head 5 and printing medium P both travel by a distance $\Delta D$ equivalent to eight pixel lines in the direction of arrow A. The printing head 5 thus prints pixel lines that are perpendicular to direction A.

The printing elements or nozzles HD1 to HD16 in the four printing elements groups 5Y, 5M, 5C, and 5K are aligned side-by-side in the transverse direction, perpendicular to the longitudinal direction A. For example, the four printing elements HD1 in groups 5Y, 5M, 5C, and 5K are aligned in a straight line perpendicular to direction A. All four printing elements groups 5Y, 5M, 5C, and 5K therefore print on the same pixel lines.

The printing operation is performed as follows. The controller 30 commands the timing generator 40 to generate pixel column clock signals, latch signals, and drive signals CL(Y), CL(M), CL(C), CL(K), La(Y), La(M), La(C), La(K), Dr(Y), Dr(M), Dr(C), and Dr(K). Just before the yellow printing element group 5Y reaches position I, the data for sixteen pixels in the first column are shifted into the shift register 41 in FIG. 5 and latched in the latch circuit 42. At position I, a drive signal Dr(Y) enables the AND gates 43, and drops of yellow ink are ejected for those pixels having "1" pixel data. While these pixels are thus being printed, the data for the sixteen pixels in the next column are being shifted into the shift register 41. This operation continues until the last pixel column at position J has been printed.

The other colors are printed in the same way. Printing of yellow, magenta, cyan, and black begins when the printing head 5 has moved by distances of Ws, Ws+Wp, Ws+2Wp, and Ws+3Wp, respectively, from its home position.

FIGS. 9A to 9F illustrate the printing operation in the same way that FIGS. 8A to 8F illustrated the scanning operation. The printing medium P travels at a uniform rate in the direction of arrow A, and this rate is controlled so that the seventeenth printed pixel line begins just below the sixteenth printed pixel line, the distance between the fifteenth and sixteenth pixel lines being equal to the distance between the sixteenth and seventeenth pixel lines.

Scanning and printing continue in this way until the last group of pixel lines at the bottom of the subject copy S has been scanned, and these pixel lines have been printed at the bottom of the printing medium P. The subject copy S and printing medium P continue to travel at a uniform rate throughout the scanning and printing processes, until they are ejected by the delivery rollers 9a, 9b, 11a, and 11b.

Due to the constant, uniform transport of the subject copy S and printing medium P in the present invention, the transport process is stable and substantially free of the motion irregularities that caused a banded appearance in the prior art. Moreover, even if small irregularities occur, the irregularities will tend to be distributed across the width W of the printing area, making them less visible. The printed copy will not be marred by straight seams running across the page. Nor will there be any of the density variations produced by the prior-art scheme of intentional overlapping of pixel lines. The quality of the copy will be considerably improved, as compared with the prior art.

The alignment of the red, blue, and green scanning elements Dn in a single transverse line and the alignment of the yellow, magenta, cyan, and black printing elements HDn in a single transverse line enables the color converter 36 to convert red, green, and blue scanned data to yellow, magenta, cyan, and black printing data on a line-by-line basis, and is an advantage from the standpoint of accurate color conversion.

Second Embodiment

Figure 10:
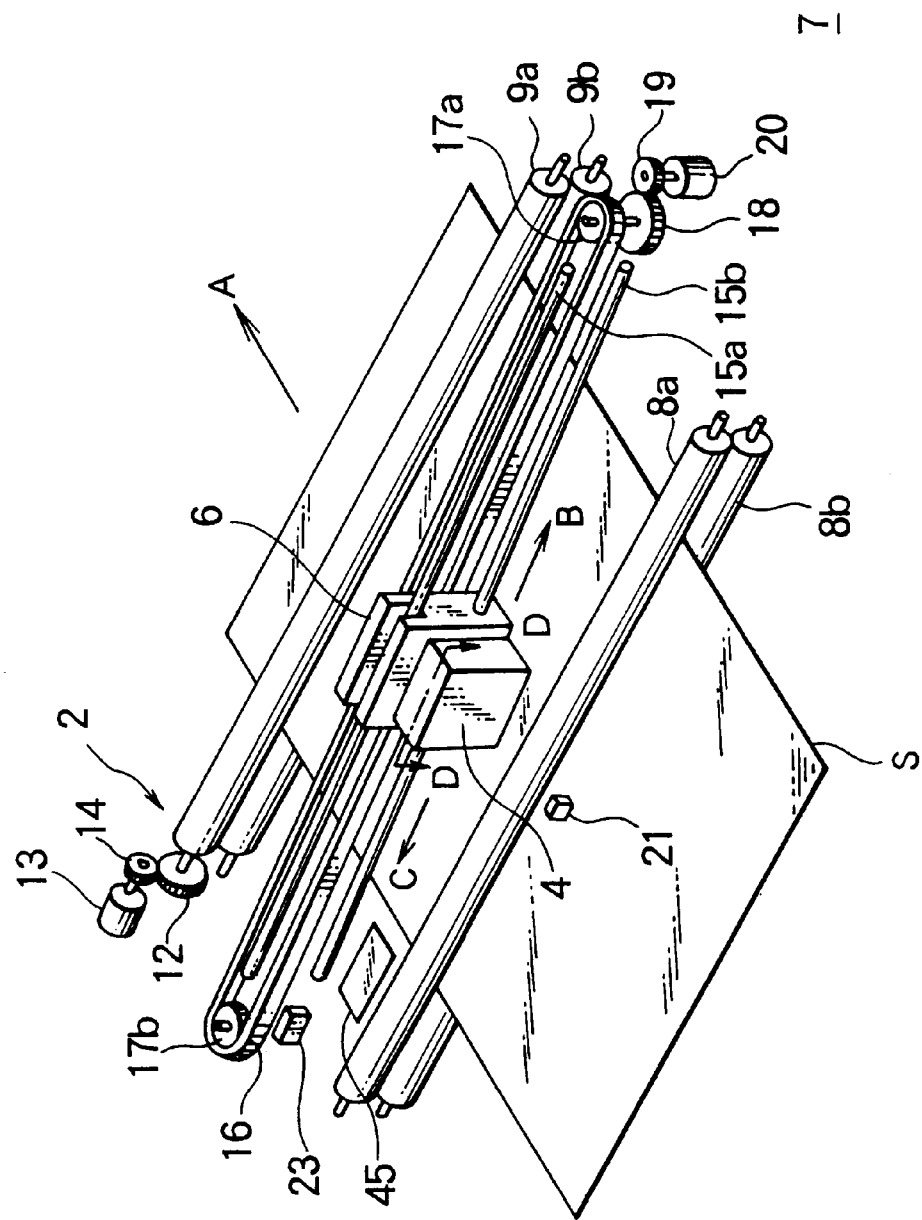
FIG. 10 is a perspective cutaway view of an embodiment of the invented scanner.

FIG. 10 shows a scanner, using the same reference numerals as in FIG. 1 for identical parts, and illustrating the white reference plate 45. This scanner is basically identical to the scanning part of the copier in the first embodiment, except that the subject copy S is scanned face-up instead of face-down, so the scanning head 4 is upside-down in relation to FIG. 1. Detailed descriptions of the scanning head 4 and other parts will be omitted.

Figure 11:
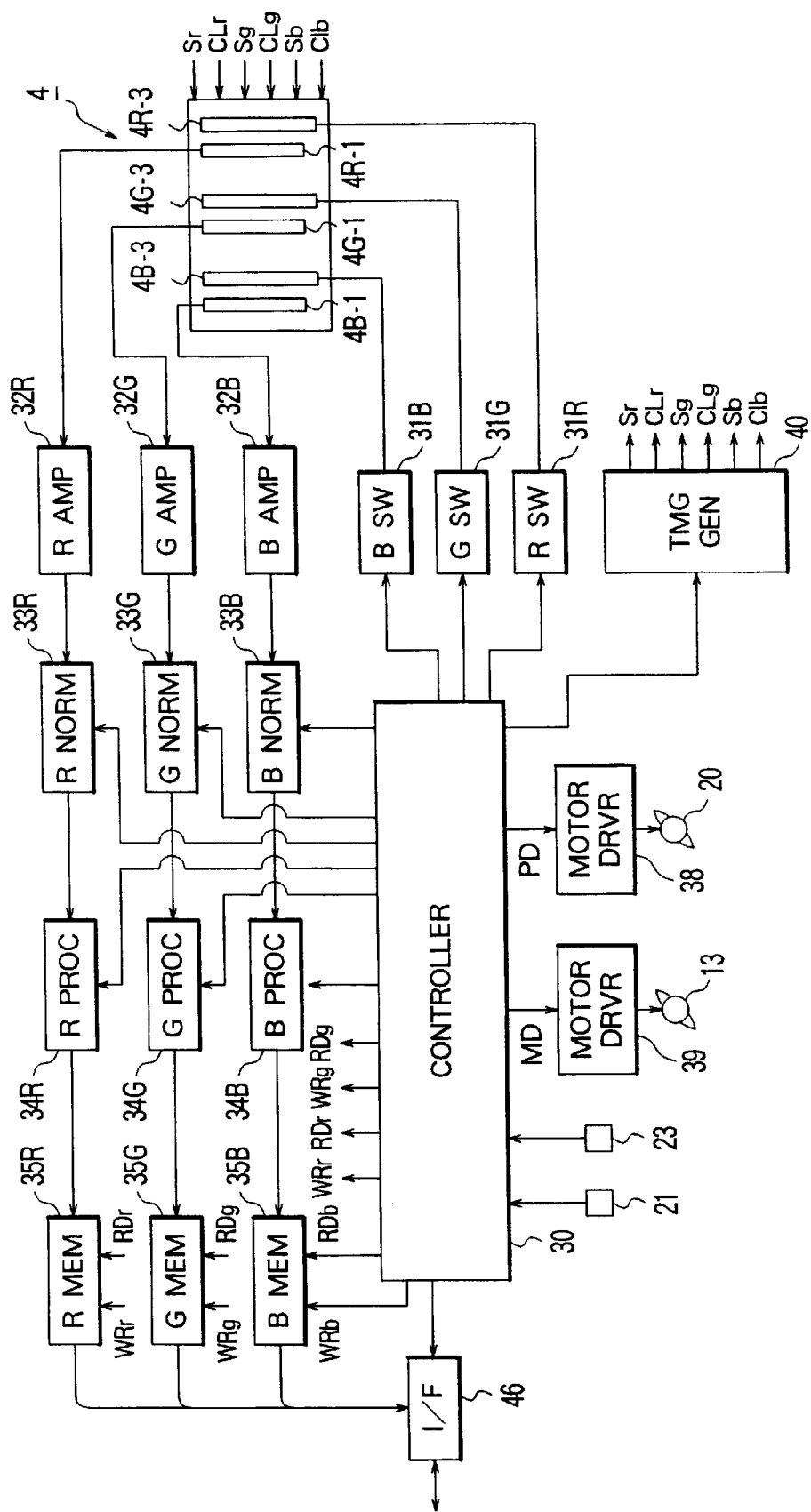
FIG. 11 is a block diagram of the control system of the scanner in FIG. 10.

FIG. 11 shows the control circuits of the scanner in FIG. 10, using the same reference numerals as in FIG. 3 for identical or equivalent parts. Descriptions of these parts will also be omitted. The only part not appearing in FIG. 3 is an interface (I/F) circuit 46, which communicates with an external device such as a computer or printer (not visible). The interface circuit 46 receives interface control signals from the controller 30, reads pixel data from data memories 35R, 35G, and 35B, and sends the pixel data to the external device. Among the interface control signals are a sampling clock signal, a line request signal that requests the transmission of a line of pixel data to the external device, a signal that switches between the transmit and receive modes, and a signal that indicates the effective length of one line of pixel data.

The scanning operation is performed as described in the first embodiment to obtain pixel data, which are stored in data memories 35R, 35G, and 35B. In response to control signals from the controller 30, the interface circuit 46 reads the pixel from the data memories 35R, 35G, and 35B, and transmits the pixel data to the external device.

It is convenient if the data memories 35R, 35G, and 35B memories have sufficient space to store pixel data for an entire page of subject copy S. The pixel data can then be transferred without risk of memory overflow, regardless of the rate of transfer supported by the external device. If high-speed transfer can be assured, however, the data can be transferred line-by-line as they are scanned, by providing line buffers in the interface circuit 46, and the cost of the scanner can be reduced by providing the data memories 35R, 35G, and 35B with only enough capacity to store data for one transverse scan.

The effects of the second embodiment are similar to those of the first embodiment: motion irregularities are substantially eliminated because of transport of the subject copy S at a constant, uniform rate; any irregularities that remain tend to be distributed over the width of the subject copy S, so noticeable seams to not appear in the scanned data; and alignment of the scanning elements enables the same pixel lines to be scanned in all three colors.

Third Embodiment

Figure 12:
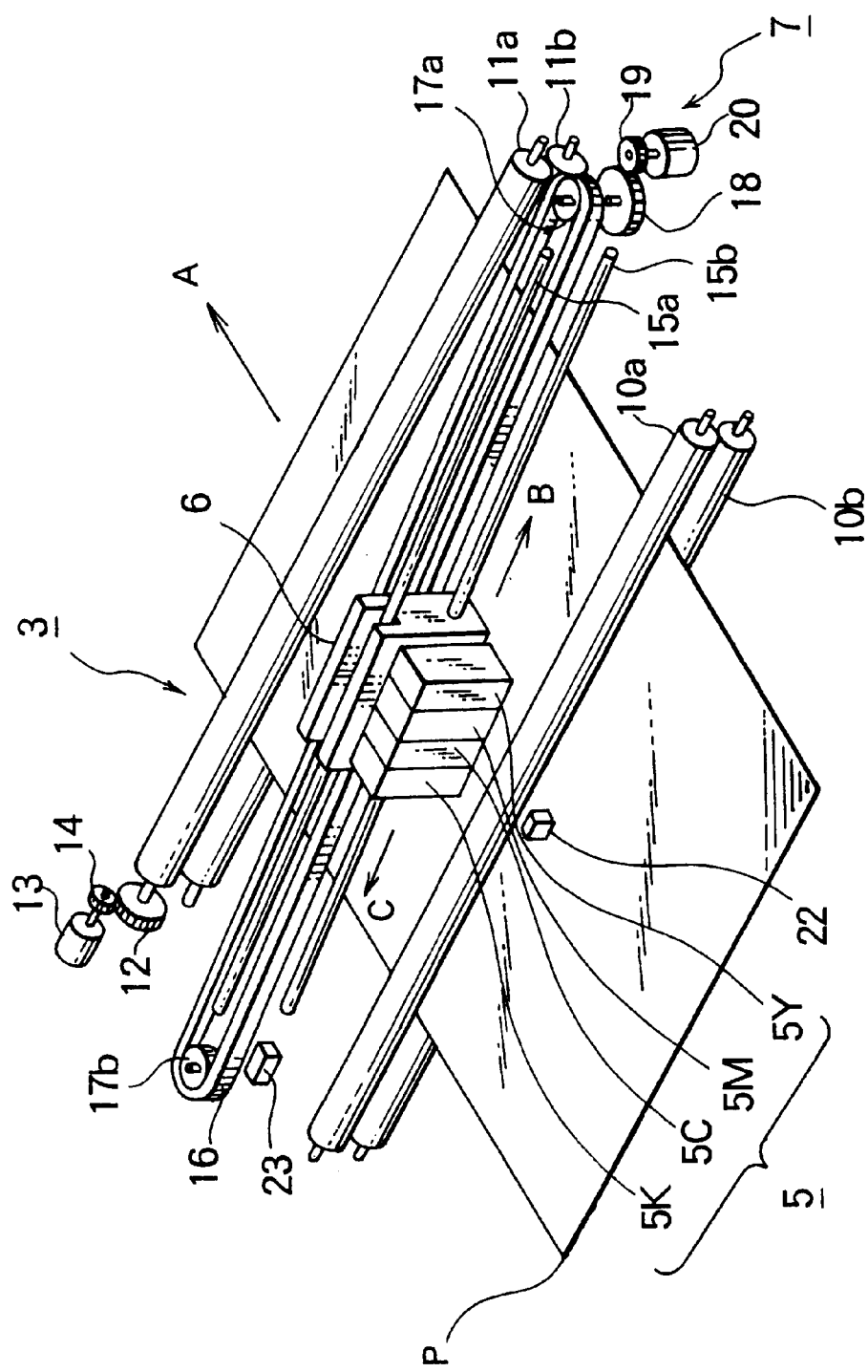
FIG. 12 is a perspective cutaway view of an embodiment of the invented printer.

FIG. 12 shows an ink-jet printer, using the same reference numerals as in FIG. 1 for identical parts. This printer has essentially the same configuration as the printing part of the copier in the first embodiment, so a detailed description will be omitted.

Figure 13:
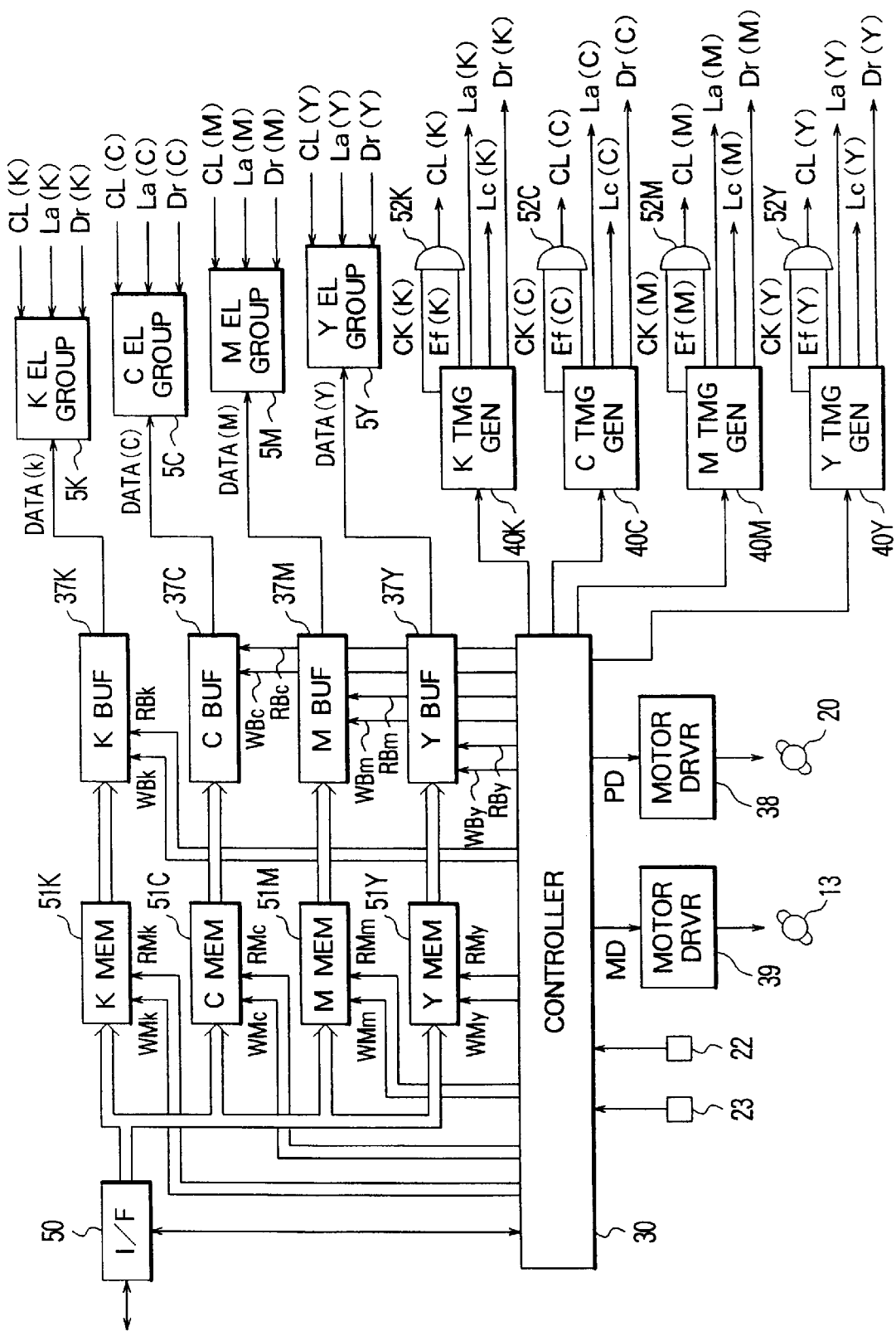
FIG. 13 is a block diagram of the control system of the printer in FIG. 12.

FIG. 13 shows the control circuits of the printer in FIG. 12, using the same reference numerals as in FIG. 3 for identical or equivalent parts. Pixel data are received from a computer, scanner, or other external device through an interface 50, which converts the data to yellow, magenta, cyan, and black pixel data, and stores these data in respective data memories (MEM) 51Y, 51M, 51C, and 51K. The data memories have enough capacity to store data for an entire page at a time, enabling the interface 50 to receive data a page at a time. The interface 50 also receives control signals from the controller 30, such as a sampling clock signal, a request signal requesting data from the external device, and a signal indicating the effective length of a page.

Reading and writing of data in the data memories 51Y, 51M, 51C, and 51K are controlled by read control signals RMy, RMm, RMc, and RMk and write control signals WMy, WMm, WMc, and WMk output by the controller 30. The data read from these data memories are stored in the line buffers 37Y, 37M, 37C, and 37K.

In place of the timing generator 40 in FIG. 3, this printer has four timing generator blocks 40Y, 40M, 40C, and 40K, which comprise programmable counters and the like, and are equivalent to parts of the timing generator 40 that controlled printing operations in the first embodiment. Each timing generator block outputs a master clock signal CK, a pixel column clock signal Lc, an enable signal Ef, a latch signal La, and a drive signal Dr. AND gates 52Y, 52M, 52C, and 52K take the logical AND of the master clock signal CK and enable signal Ef from the corresponding timing generator block, and output a shift clock CL. The printing element groups 5Y, 5M, 5C, and 5K receive the shift clock CL, latch signal La, and drive signal Dr.

Next, the operation will be described.

When the printer is powered up, the controller 30 carries out an initialization sequence in which it clears the data memories 51Y, 51M, 51C, and 51K and moves the carriage 6 to the home position. More precisely, the controller 30 sends commands to the interface 50 and motor driving circuit 38 that result in these operations being carried out, and confirms from the photosensor 23 that the carriage 6 has been homed. The printer is then ready to receive pixel data from the external device connected to the interface 50.

When the pixel data are received, they are stored in the data memories 51Y, 51M, 51C, and 51B under control of the controller 30, which outputs the necessary memory write control signals WMy, WMm, WMc, and WMk. When data for one page have been received, the controller 30 activates a mechanism (not shown) to feed one sheet of printing medium P into position for printing, and prints the page by the procedure described in the first embodiment, the pixel data being read from the data memories 51Y, 51M, 51C, and 51B sixteen lines at a time.

Figure 14:
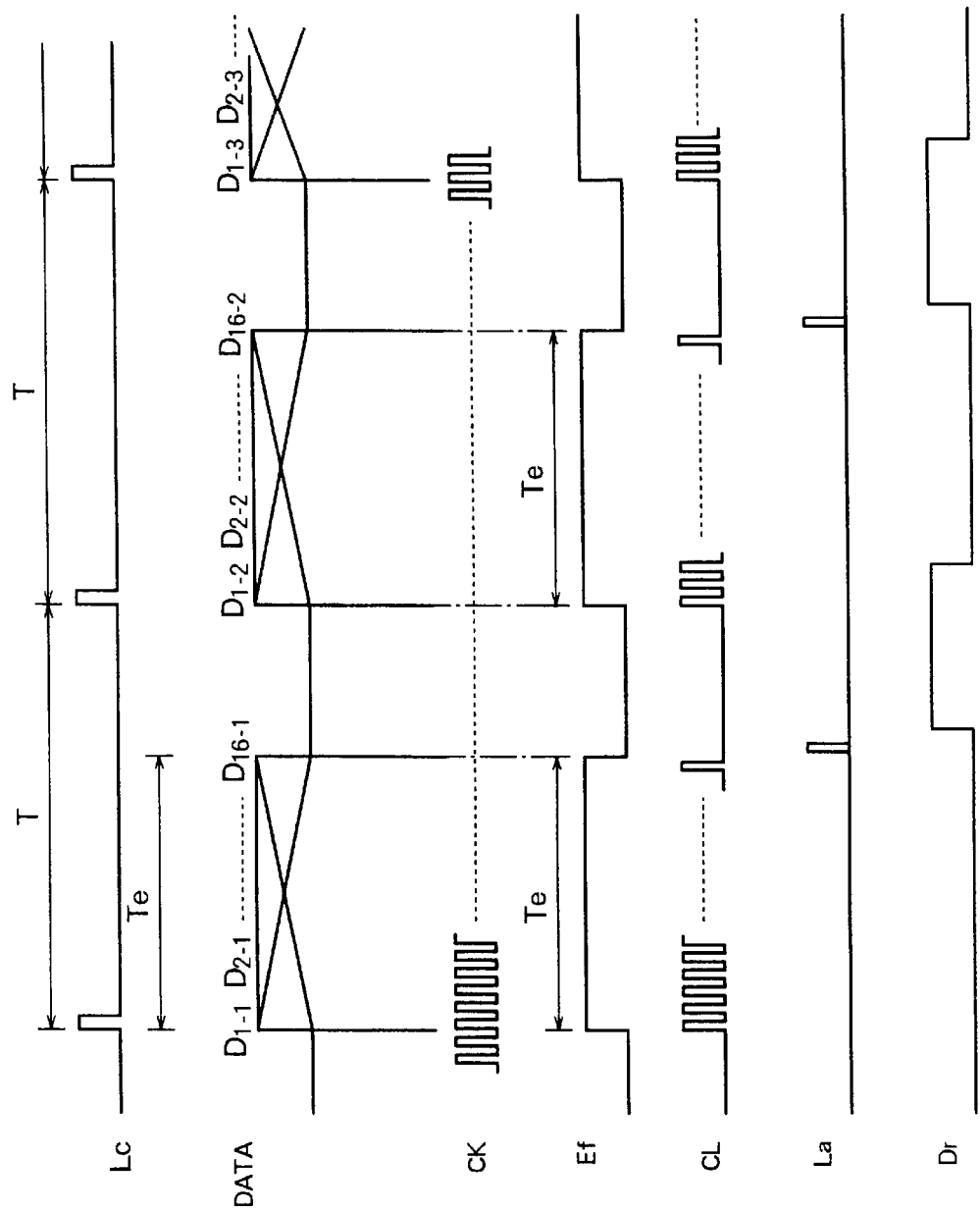
FIG. 14 is a timing diagram illustrating the operation of the printer in FIG. 12.

FIG. 14 illustrates the timing of the signals output by the timing generator blocks 40Y, 40M, 40C, and 40K. These signals are output independently, at different timings, by each block. The pixel column clock signal Lc at the top of FIG. 12 defines intervals of length T, during each of which one column of sixteen pixels is printed. During an initial period Te of the time T, the enable signal Ef goes high, allowing the master clock CK to pass through the AND gate 52Y, 52M, 52C, or 52K and generate the shift clock CL. Pixel data $D_{1-n}$, $D_{2-n}$, . . . , $D_{16-n}$ are shifted into the shift register 41 in synchronization with these signals, where n is an integer denoting the column. At the end of this interval Te, the enable signal Ef goes low, and a latch pulse La is output to latch the data in the latch circuit 42. Then the drive signal Dr goes high to print the data. Dr remains high for the necessary printing time, and goes low in the next interval T, after the shifting of the data for the next pixel column into the shift register 41 has already begun.

The relation between the motion of the printing medium P to the motion of the printing head 5 will be described below under the assumption that the printing head 5 advances by eight pixel lines while crossing the printing area, as illustrated in FIG. 7. During one complete cycle of motion of the printing head 5, from the commencement of the printing of pixel lines one to sixteen to the commencement of the printing of pixel lines seventeen to thirty-two, the printing head 5 moves from position I at the beginning of the printing area to position J at the end of the printing area, then to the stopping position K, then back to the home position H, and forward to the starting position I again. The length Tp of this complete cycle is given by the equation $$Tp=Tw+Tt+TB+Tc+Th+Ts$$

where Tw is the time taken to move from I to J, Tt is the time to move from J to K, TB is the time dwelt at position K, Tc is the time to move from K to H, Th the time dwelt at H, and Ts is the time to move from H to I.

During this time Tp, the printing head 5 and printing medium P must both advance by sixteen pixel lines in the direction of arrow A, a distance equal to twice ΔD. Since the printing head 5 advances by eight pixel lines (ΔD) during time Tw, Tp can be divided into two equal portions Tw and Tn, where Tn is defined as follows:

$$Tn=Tt+TB+Tc+Th+Ts$$

Since Tw and Tn are equal, $$Tc=Tw-(Tt+TB+Th+Ts)$$

Thus the printing head 5 must travel faster in moving from the stopping position K to the home position H than while moving in the opposite direction.

In addition, regardless of the value of ΔD, while the printing head 5 completes one cycle of length Tp, the printing medium P must advance by a distance equivalent to N pixel lines, where N is the number of pixel lines printed in one transverse scan (sixteen lines in the present case). The uniform rate at which the printing medium P advances is therefore N/Tp. In traveling from position I to position J, the printing head 5 advances by ΔD pixel lines in time Tw, giving a rate of advance of ΔD/Tw. To make the printing medium P and printing head 5 advance at the same rate, their motion is controlled so that N/Tp equals ΔD/Tw, or so that $$Tw=(\Delta D/N)Tp$$

This equation also applies to the motion of the scanning head 4 and subject copy S in the second embodiment, and the motion of the scanning and printing heads 4 and 5, subject copy S, and printing medium P in the first embodiment.

The printer in this third embodiment has been described as receiving one page of data at a time, but this is not a necessary condition. The printer can begin printing as soon as it has received data for sixteen pixel lines, and further data can be received while the printing of these pixel lines is in progress. This scheme can reduce the cost of the printer by allowing the size of the data memories 51Y, 51M, 51C, and 51K to be reduced.

Fourth Embodiment

The fourth embodiment is a modification of the third embodiment in which each group of sixteen pixel lines is printed in two transverse scans, to reduce power consumption during each scan. The mechanical configuration of the fourth embodiment is the same as that of the third embodiment, shown in FIG. 12.

Figure 15:
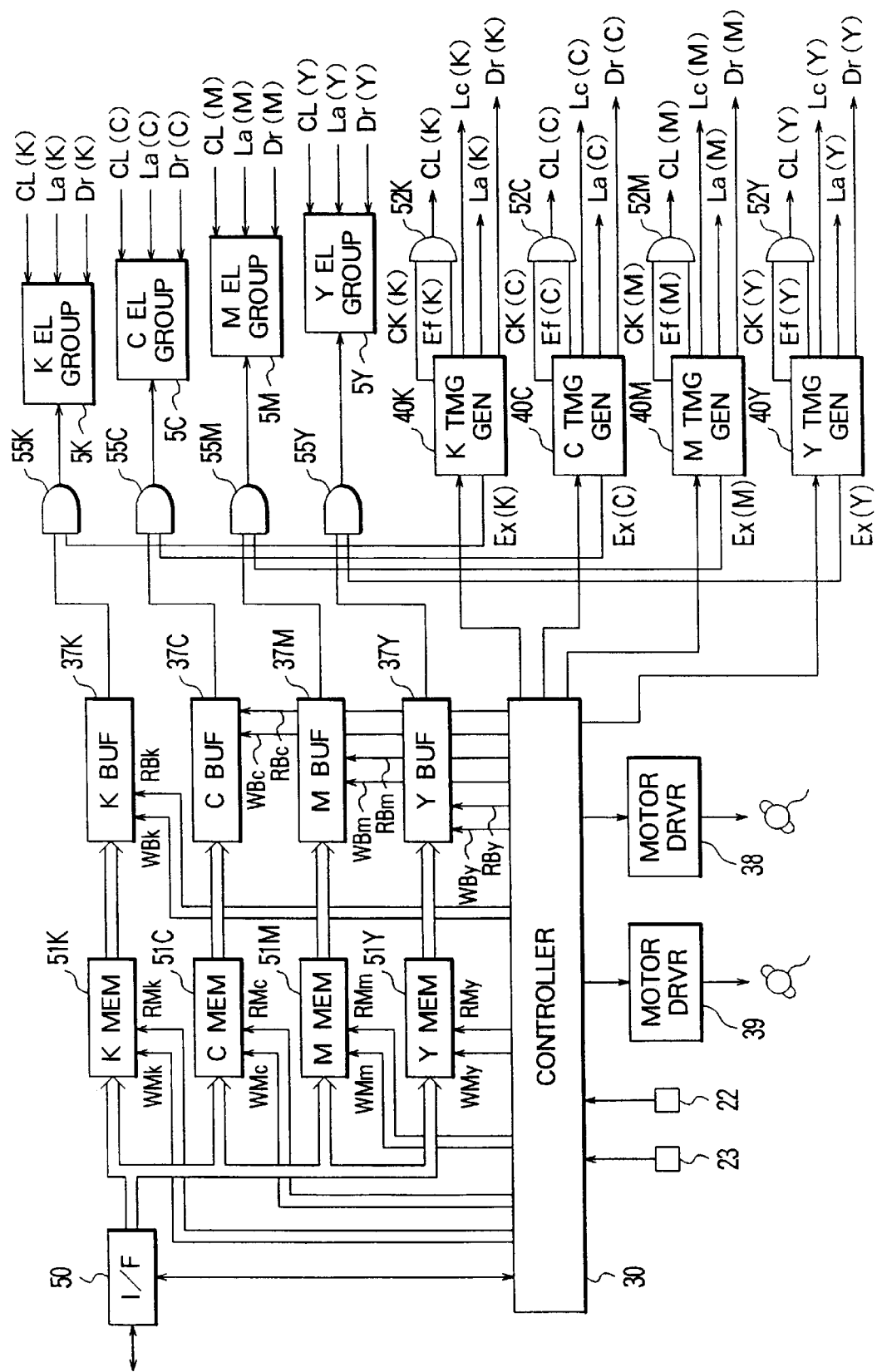
FIG. 15 is a block diagram of the control system of another embodiment of the invented printer.

FIG. 15 is a block diagram of the control system in the fourth embodiment, using the same reference numerals as in FIG. 13 for equivalent parts. The only difference from FIG. 13 is the addition of four AND gates 55Y, 55M, 55C, and 55K on the signal lines between the line buffers 37Y, 37M, 37C, and 37K and printing element groups 5Y, 5M, 5C, and 5K. One input to each of these AND gates 55Y, 55M, 55C, and 55K is the data signal from the corresponding line buffer. The other input is an extraction signal Ex output by the corresponding timing generator block.

In the fourth embodiment, the sixteen printing elements in each printing element group are divided into four subgroups, comprising elements HD1 to HD4, HD5 to HD8, HD9 to HD12, and HD13 to HD16, respectively. The second and fourth subgroups (HD5 to HD8 and HD13 to HD16) print on the first transverse scan. The first and third subgroups (HD1 to HD4 and HD9 to HD12) print on the second scan.

Referring to FIG. 16A, after the pixel data for the first sixteen lines have been transferred from the data memories 51Y, 51M, 51C, and 51K to the line buffers 37Y, 37M, 37C, and 37K, when the yellow printing element group 5Y reaches position I, the yellow timing generator block 40Y begins output of pixel column clock signals Lc with a period T, as in the third embodiment. In the first scan, the yellow timing generator block 40Y activates the enable signal Ef for sixteen master clock periods at the beginning of each period T to generate the shift clock CL, and activates the extraction signal Ex for two intervals of a length Td equal to four master clock periods. The first of these intervals is delayed by Td from the pixel column clock signal LC. The pixel data $D_{1-n}$ to $D_{16-n}$ are output during an interval that is also delayed by Td from the pixel column clock signal LC (where n designates the pixel column number).

During the initial delay of Td, Ex is inactive (low), the output of AND gate 55Y is low, and four bits with the low logic level ('0') are shifted into the shift register 41. During the next interval of length Td, the extraction signal Ex goes high, so bits $D_{1-n}$ to $D_{4-n}$ pass through AND gate 55Y and enter the shift register 41. In the next interval of length Td, Ex goes low, and the shift register 41 receives four more bits with the zero logic level, regardless of the actual values of $D_{5-1}$ to $D_{8-1}$. In the next interval of length Td, Ex goes high again, and the shift register 41 receives $D_{9-n}$ to $D_{12-n}$. At the end of this interval, the latch signal La goes high, latching data $D_{1-n}$ to $D_{4-n}$ in position to be printed by printing elements HD5 to HD8, data $D_{9-n}$ to $D_{12-n}$ in position to be printed by printing elements HD13 to HD16, and zero data ('0') in the other positions. Printing takes place in the interval while the drive signal Dr is high. During this interval, data $D_{13-n}$ to $D_{16-n}$ are output from the line buffer 37Y, but the extraction signal Ex and enable signal Ef are both low, so the shift register 41 receives no data at all.

The other colors are printed in the same way during the first scan, which prints the pixel lines one to four and nine to twelve. During this scan, printing elements HD1 to HD4 and HD9 to HD12 do not print any pixels, because all their data are zero ('0').

Figure 16B:
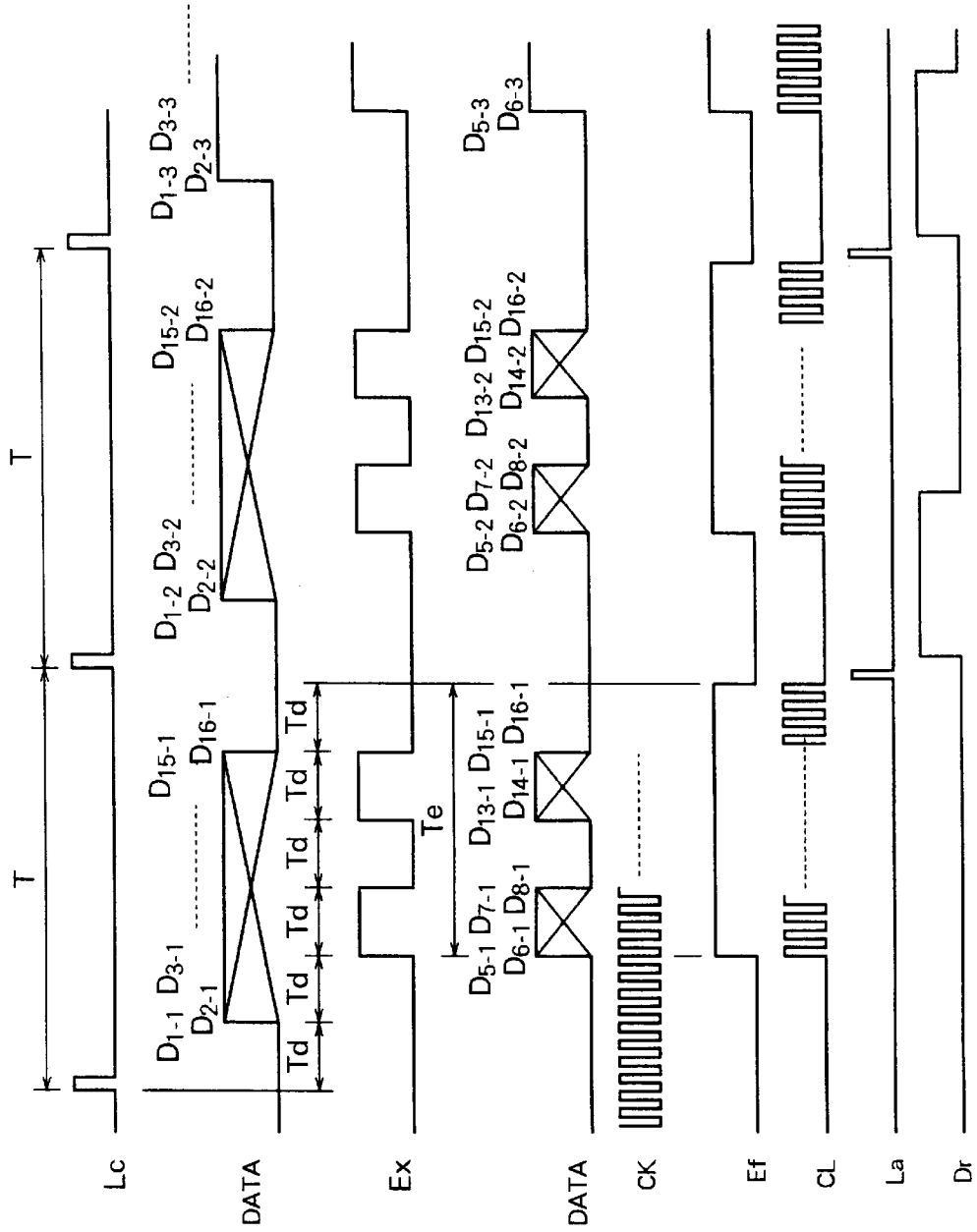

In the second scan, the timing is changed as shown in FIG. 16B. Output of the extraction signal Ex and enable signal Ef is now delayed by 2Td from the pixel column clock signal LC. The same data $D_{1-n}$ to $D_{16-n}$ are output from the line buffer a second time, delayed by Td from the pixel column clock LC as before. The result is that data $D_{5-n}$ to $D_{8-n}$ are printed by printing elements HD1 to HD4, and data $D_{13-n}$ to $D_{16-n}$ are printed by printing elements HD9 to HD12. Printing elements HD5 to HD8 and HD13 to HD16 do not print during the second scan, because all their data are zero ('0'). The second scan prints pixel lines five to eight and thirteen to sixteen.

The first two scans are illustrated in FIGS. 17A to 17I. In FIG. 17A, the printing head 5 is at its home position, with printing elements HD5 to HD8 aligned with pixel lines one to four. In FIGS. 17B and 17C the printing head 5 scans across the printing medium P, printing pixel lines one to four and nine to twelve as described above. Differing from the third embodiment, the distance ΔD by which the printing head 5 and printing medium P move in the longitudinal direction (arrow A) during this scan corresponds to less than eight pixel lines. ΔD may be equivalent to four pixel lines, for example. In FIGS. 17D and 17E the printing head 5 moves from its stopping position back to its home position.

During the entire cycle from FIG. 17A to FIG. 17E, the printing medium P advances by eight pixel lines in the direction of arrow A, instead of sixteen pixel lines as in the third embodiment. Thus in FIG. 17E, printing elements HD1 to HD4 are aligned with pixel lines five to eight, and printing elements HD9 to HD12 with pixel lines thirteen to sixteen. These pixel lines are printed during the second scan, shown in FIGS. 17F and 17G.

When the printing head 5 returns to its home position in FIG. 17H, printing elements HD1 to HD4 are aligned with pixel lines thirteen to sixteen. In the next scan, shown starting in FIG. 17I, printing elements HD5 to HD8 print pixel lines seventeen to twenty, and printing elements HD13 to HD16 print pixel lines twenty-five to twenty-eight.

In this embodiment, each group of N pixel lines (sixteen pixel lines in the present example) is printed in two cycles of motion of the printing head 5, each cycle beginning and ending at the home position. If the cycles are numbered consecutively, then the first and third subgroups of printing elements (HD1 to HD4 and HD9 to HD12) print during even-numbered cycles, and the second and fourth subgroups of printing elements (HD5 to HD8 and HD13 to HD16) print during odd-numbered cycles. The conditions on the cycle duration Tp, the duration Tw of the printing interval, the number N, and the number ΔD are now as follows:

$Tw = 2Tp(\Delta D/N)$ $0 < \Delta D < N/2$

The printing scheme illustrated in this embodiment enables the pixel lines to be printed in an interleaved manner, with the correct pixel data being printed in each pixel line. Because of the interleaving, the maximum number of printing elements that need be driven at any one time is only half the maximum number in the third embodiment. This enables the power supply for the printing head 5 to be smaller than in the third embodiment, reducing the cost of the printer.

The same reduction in driving power could be achieved without interleaving, by using only half of the printing elements in the printing head 5, or by using a printing head with only half as many printing elements, but in that case each printing element would have to print twice as many pixel lines, leading to a corresponding shortening of the service life of the printing head.

The same type of interleaving can be used in scanning, by dividing each group of scanning elements in the scanning head into four subgroups. Thus the power required by a copier can be reduced by having the scanning head 4 scan the subject copy S in the interleaved manner described above, and having the printing head 5 print on the printing medium P in the interleaved manner described above.

Fifth Embodiment

Figure 18:
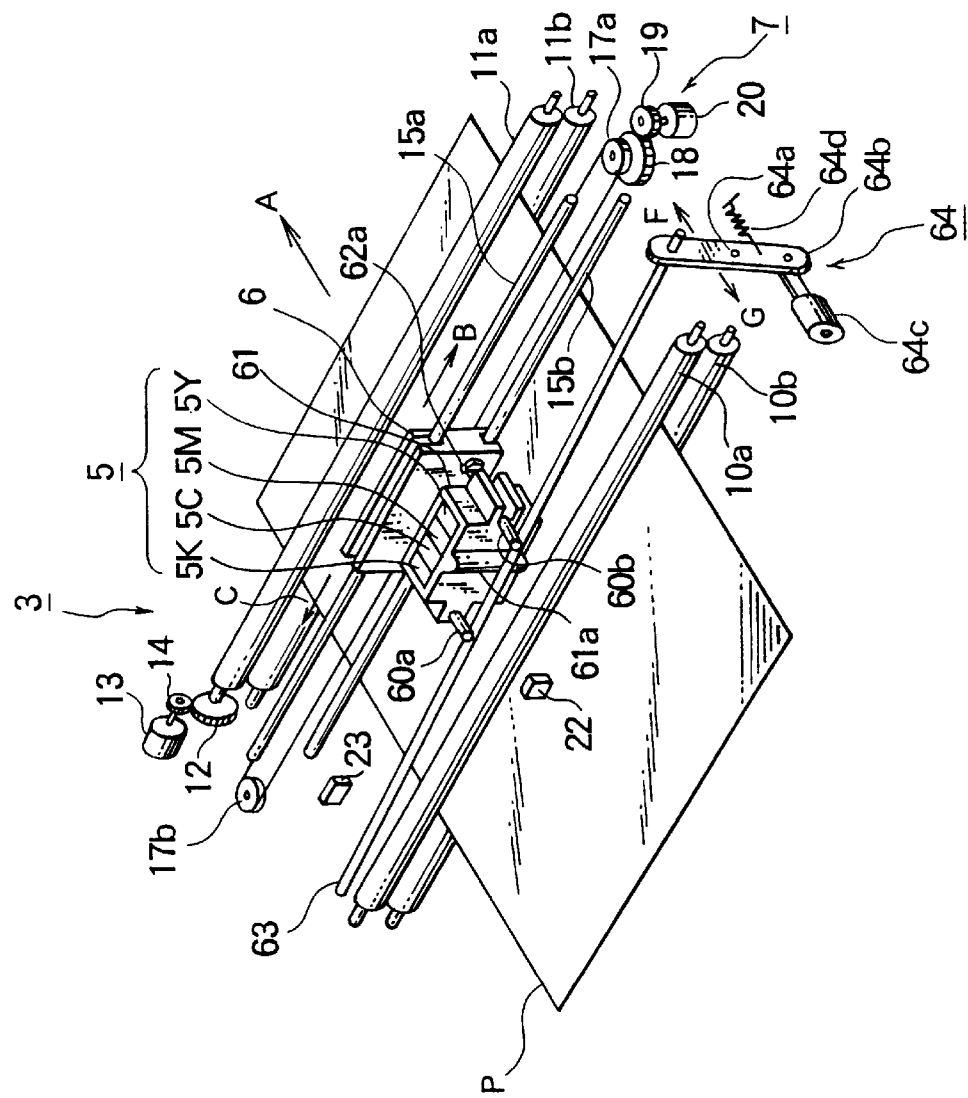
FIG. 18, and FIG. 18A is a enlarged view of the printing head thereof, is a perspective cutaway view of still another embodiment of the invented printer.
Figure 18A:
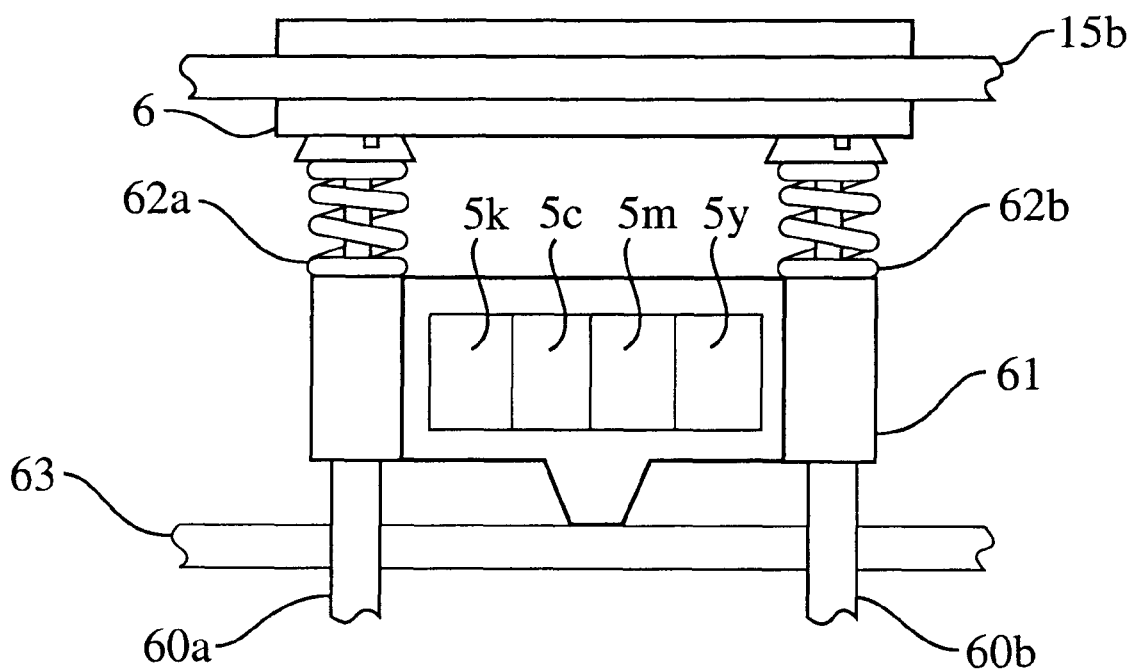

FIGS. 18 and 18A show a printer that differs from the third embodiment in the way in which the printing head 5 is mounted on the carriage 6. The same reference numerals as in FIG. 12 are used for equivalent elements. The guide shafts 15a and 15b on which the carriage 6 travels are now oriented in the transverse direction, perpendicular to the longitudinal direction of travel of the printing medium P (arrow A), instead of at an acute angle. Projecting backward from the carriage 6, in the direction opposite to direction A, are a pair of guide pins 60a and 60b. The printing head 5 is held in a head case 61, which is slidably mounted on these pins 60a and 60b. As best shown in FIG. 18A, a pair of springs 62a and 62b (spring 62b is not visible) are mounted so as to push the printing head 5 away from the carriage 6. The head case 61 has a projection 61a which is thus pushed into contact with another guide shaft 63.

One end of this guide shaft 63 (the near end in the drawing) is mounted in a shaft moving mechanism 64 that can move this end of the guide shaft 63 back and forth in the direction of arrows F and G. This lever mechanism 64 comprises a pivot pin 64a rotatably supporting a lever 64b, one arm of which is attached to a magnet plunger 64c and a coil spring 64d. The other arm of the lever 64b supports the near end of guide shaft 63.

The far end of guide shaft 63 is rotatably mounted in a hinged supporting device (not shown) that permits motion of the near end in the above-mentioned directions F and G.

The magnet plunger 64c is a solenoid device. When energized, it pulls the lever 64b so that the end of guide shaft 63 moves in the direction of arrow F, and holds the lever 64b in a position such that the guide shaft 63 is oriented at an acute angle to the longitudinal direction A. When the magnet plunger is not energized, the coil spring 64d pulls the lever so that the guide shaft 63 moves in the direction of arrow G, and holds the lever 64b in a position such that the guide shaft 63 is oriented in the transverse direction, parallel to guide shafts 15a and 15b and perpendicular to the longitudinal direction A.

Figure 19:
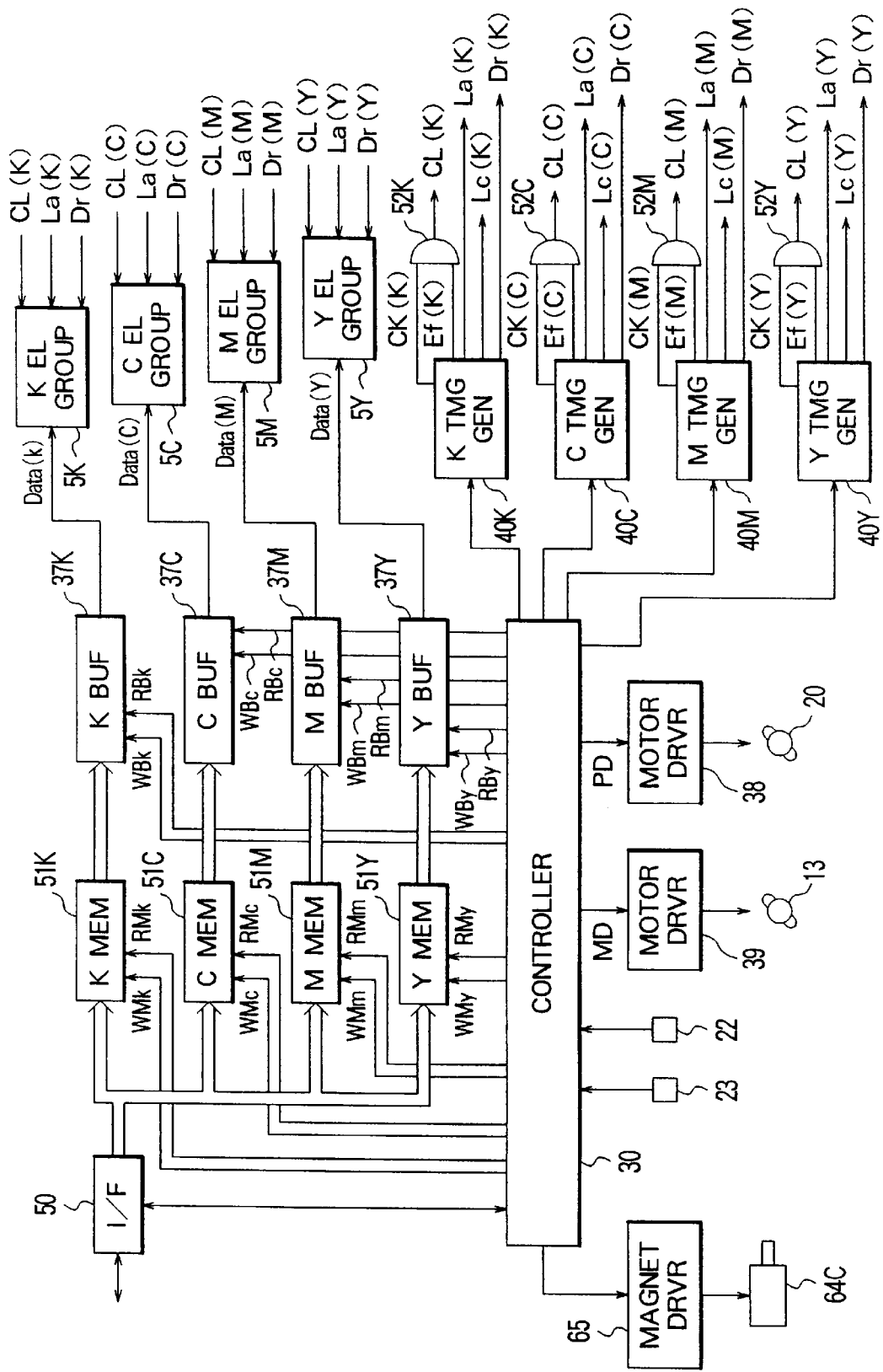
FIG. 19 is a block diagram of the control system of the printer in FIG. 18.

FIG. 19 is a block diagram of the control system of this printer, using the same reference numerals as in FIG. 13 for equivalent parts. The only new part is a plunger magnet driving circuit 65 that energizes the magnet plunger 64c on command from the controller 30.

The fifth embodiment operates in two modes: a unidirectional printing mode and a bidirectional printing mode.

In the unidirectional printing mode, the magnet plunger 64c is energized, orienting guide shaft 63 at an acute angle to the longitudinal direction A. The printing head 5, which is guided by guide shaft 63, moves as illustrated in FIGS. 7 and 9, advancing by an amount ΔD in direction A as it travels across the printing medium P, which advances at a uniform rate. In the unidirectional printing mode, that is, the fifth embodiment operates like the third embodiment.

In the bidirectional printing mode, the magnet plunger 64c is not energized, the guide shaft 63 is oriented perpendicular to the longitudinal direction A, and the printing head 5 moves in this perpendicular direction. In this mode the printing medium P is not advanced at a uniform rate, but is held stationary while the printing medium P is moving from the home position H to the stopping position K, is advanced by at least sixteen pixel lines while the printing head 5 dwells at the stopping position K, is held stationary while the printing head 5 returns from the stopping position K to the home position H, and is advanced by at least sixteen pixel lines again while the printing head 5 dwells at the home position H. Printing is carried out during both the forward motion from H to K and the return motion from K to H.

In the bidirectional mode, the fifth embodiment operates as in the prior art; the actual printing takes place while the printing medium P is stationary. The advantage of the bidirectional mode is that a page can be printed more quickly than in the unidirectional mode.

In both the unidirectional and bidirectional modes, the printing head 5 is oriented so that the printing elements in each printing element group are aligned parallel to direction A, and corresponding printing elements in different printing element groups are aligned in the transverse direction, perpendicular to direction A. Moving guide shaft 63 in direction F or G does not change this orientation. Thus in both modes, all colors print on the same pixel lines.

The unidirectional and bidirectional modes can be selected by a command from the external device that supplies the data to be printed, or can be selected automatically by the controller 30 according to the type of data to be printed. The unidirectional mode is suitable for printing natural images and other graphics. The bidirectional mode is suitable for printing pages of text, in which the advance of the printing medium P can be a line-feed motion carried out between the lines of printed text.

Figure 20:
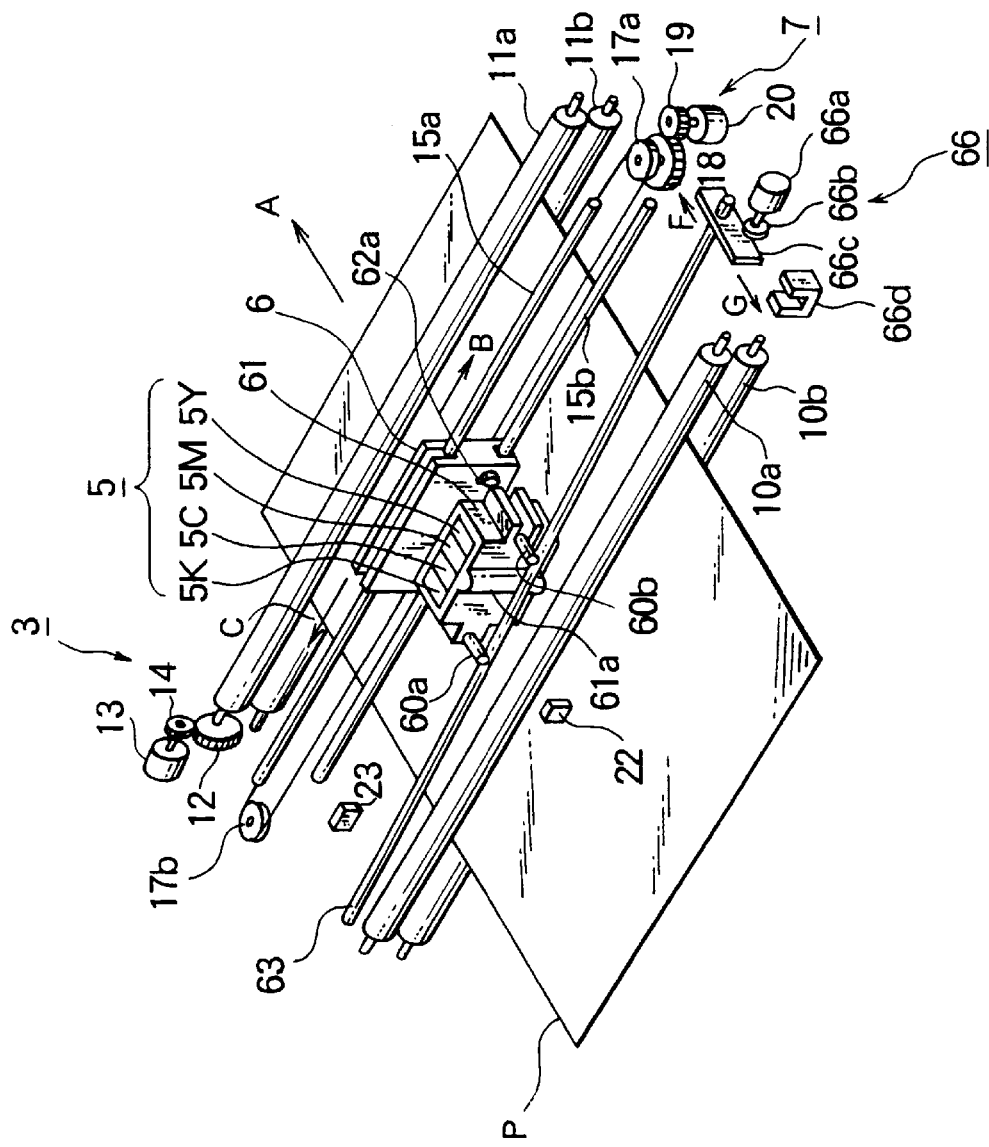
FIG. 20 is a perspective cutaway view of a variation of the embodiment shown in FIG. 18.

FIG. 20 shows a variation of the fifth embodiment in which the shaft moving mechanism 66 comprises a stepping motor 66a, pinion 66b, rack 66c, and photosensor 66d. The near end of guide shaft 63 is attached to the rack 66c. The photosensor 66d detects the rack 66c when guide shaft 63 is positioned parallel to guide shafts 15a and 15b. From this position, the stepping motor 66a can drive the pinion 66b to move the near end of guide shaft 63 to a position such that the printing head 5 advances by an arbitrary distance ΔD while making one transverse printing scan.

This variation can also operate in both unidirectional and bidirectional printing modes. In the unidirectional mode, moreover, the distance ΔD by which the printing head 5 advances can be adjusted according to the width of the printing area, a convenient feature for printers that accept printing media P of different sizes. For small media such as post cards, for example, ΔD can be increased, the printing-medium transport speed can be similarly increased, and printing can be completed more quickly than if ΔD were fixed. The correct printing-medium transport speed depends on the angle between the guide shaft 63 and the direction A in which the printing medium P is transported.

The controller 30 can be programmed to calculate the desired value of ΔD from right and left margin information supplied through the interface 50; to control the stepping motor 66a to obtain this value of ΔD; to control the transport motor 13 to advance the printing medium P at a corresponding speed; and to control the spacing motor 20 to eliminate unnecessary motion beyond the right margin.

A similar rack-and-pinion mechanism can be employed in the copier of the first embodiment or the scanner of the second embodiment to enable ΔD to be adjusted according to the width of the subject copy S. The width of the subject copy S can be sensed automatically by well-known photosensor means, and the controller 30 can be programmed to calculate ΔD and control the motors 13, 20, and 66a accordingly. Copying and scanning of small documents can thereby be speeded up.

Another advantage of using a rack-and-pinion mechanism instead of a lever is that the positioning of the guide shaft 63 is easier to control, because the end of the guide shaft 63 moves in a substantially linear direction instead of an arc.

Sixth Embodiment

Figure 21:
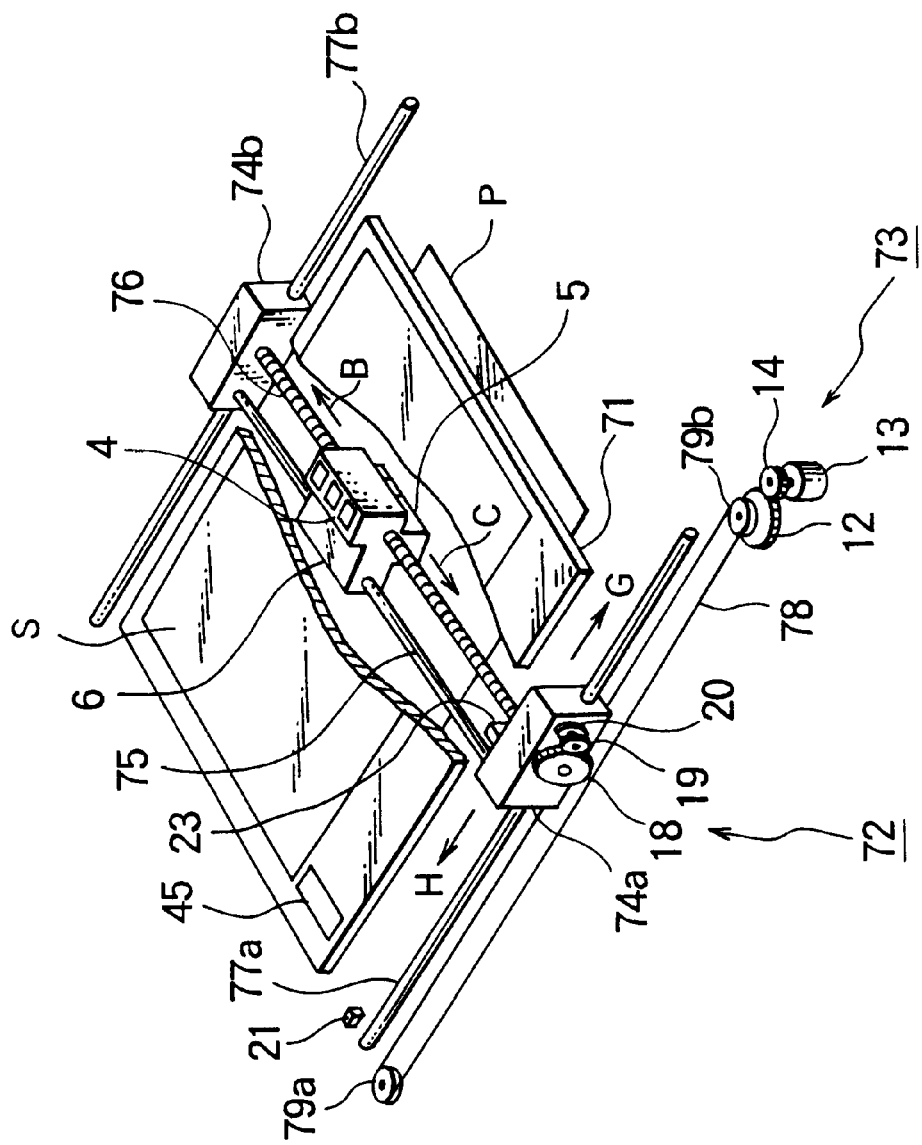
FIG. 21 is a perspective cutaway view of another embodiment of the invented copier.

FIG. 21 illustrates a copier in which the subject copy S and printing medium P remain stationary while the scanning and printing heads move 4 and 5 at a uniform rate in the longitudinal direction. The scanning and printing heads 4 and 5 also make transverse scans at an acute angle to the longitudinal direction.

The subject copy S lies on a transparent copyboard 71 comprising, for example, a sheet of glass. The scanning head 4 and printing head 5 are supported in a carriage 6 as in the first embodiment. The carriage 6 is moved in the direction of arrows B and C by a head guide mechanism 72, and the entire assembly comprising the heads 4 and 5, carriage 6, and head guide mechanism 72 is moved in the direction of arrows G and H by a head-guide transport mechanism 73.

The head guide mechanism 72 comprises a pair of gears 18 and 19, a spacing motor 20, and a photosensor 23 as in the first embodiment, and a pair of carriage frames 74a and 74b, a carriage shaft 75, and a lead screw 76. The carriage 6 rides on the carriage shaft 75, and has threads that engage the lead screw 76. By driving the lead screw 76 by means of gears 18 and 19, the spacing motor 20 moves the carriage 6 along the carriage shaft 75 in the direction of arrows B and C between the carriage frames 74a and 74b. This B-C direction is oriented at an acute angle to the longitudinal direction G-H. The photosensor 23 detects when the carriage and heads are at their home position.

The head-guide transport mechanism 73 comprises a motor 13, gears 12 and 14, and a photosensor 21 similar to the elements with the same reference numerals in the first embodiment, and has a pair of guide shafts 77a and 77b, a wire 78, and a pair of pulleys 79a and 79b. The guide shafts 77a and 77b and pulleys 79a and 79b are mounted in a frame of the copier (not shown). The guide shafts 77a and 77b are disposed on either side of the subject copy S and printing medium P, parallel to the longitudinal direction. Carriage frame 74a slides on guide shaft 77a, and carriage frame 74b on guide shaft 77b. The wire 78 is wound on the pulleys 79a and 79b, and attached to carriage frame 74a. Pulley 79b is attached to gear 12, and is driven by motor 13 through gear 14. Photosensor 21 detects when carriage frame 74a is at its home position.

The control circuitry of the sixth embodiment is substantially the same as the control circuitry of the first embodiment, illustrated in FIG. 3. The only differences are that the transport motor driving circuit 39 controls the longitudinal transport of the scanning and printing heads 4 and 5, carriage 6, and head guide mechanism 72, and the photosensor 21 detects when these are at their home position.

Although the subject copy S and printing medium P remain stationary while the scanning and printing heads 4 and 5 move longitudinally, the relative motion between them is the same as in the first embodiment, so scanning and printing operations can be carried out as in the first embodiment. A detailed description will be omitted.

The sixth embodiment is suitable for copying pages of books and other subject copy S that could not be handled by the first media transport mechanism 2 in the first embodiment. The effect of the sixth embodiment is the same as the effect of the first embodiment: copies without visible seams are obtained.

The head guide mechanism 72 and head-guide transport mechanism 73 shown in the sixth embodiment can also be applied to a scanner or printer of the type shown in the second, third, fourth, and fifth embodiments.

Seventh Embodiment

The seventh embodiment combines the serial printer of the third embodiment with a parallel printer.

Figure 22:
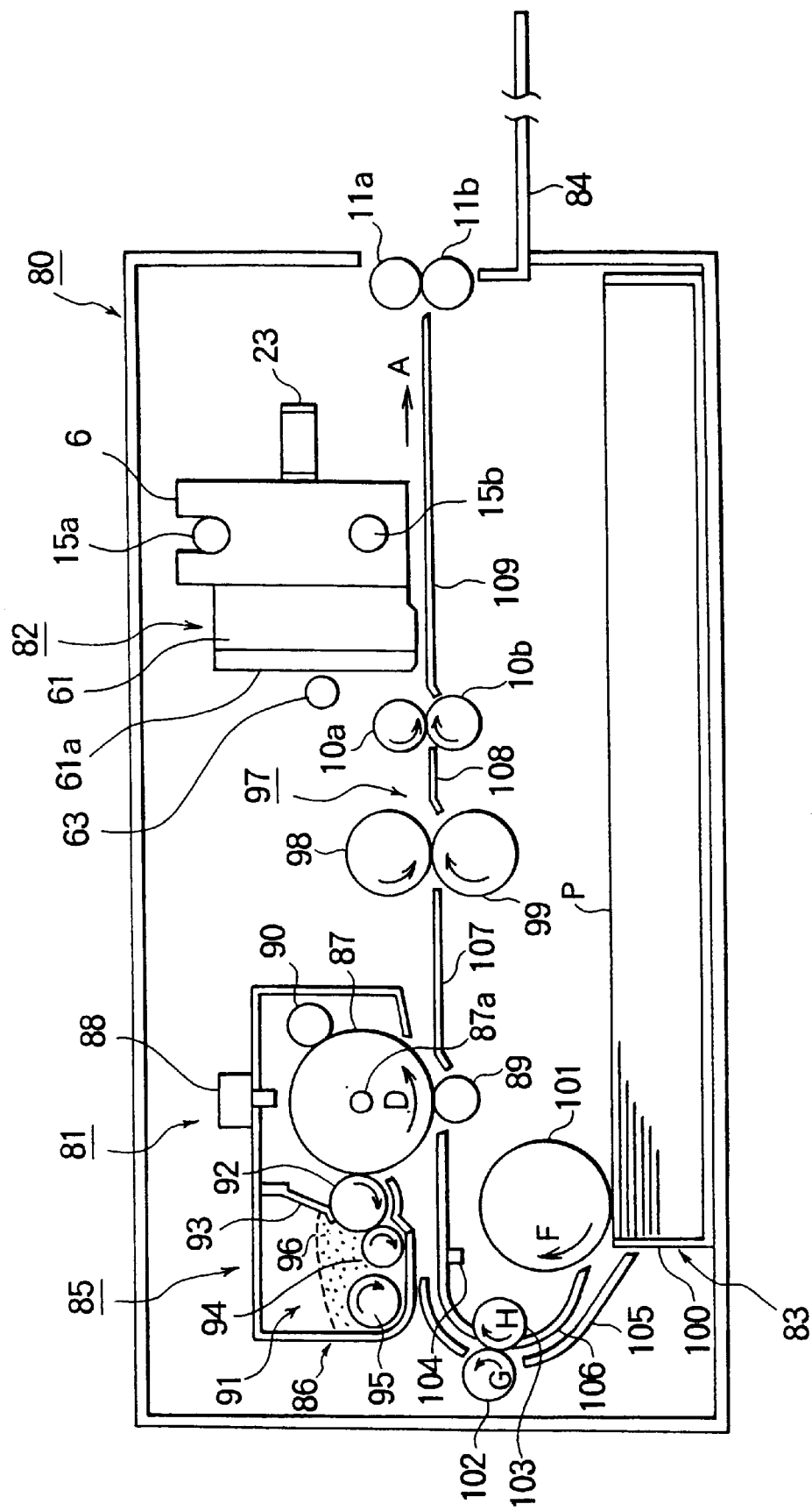
FIG. 22 is a cutaway side view of yet another embodiment of the invented printer.

Referring to FIG. 22, the printer of the seventh embodiment has a parallel printing section 81, a serial printing section 82, a paper supply section 83, and a paper delivery stacker 84. The parallel printing section 81 is referred to as 'parallel' because it prints one entire pixel line at a time.

The parallel printing section 81 employs an electrophotographic printing apparatus 85 which has an image-forming unit 86 comprising a photosensitive drum 87 that turns in the direction of arrow D on a shaft 87a, a light-emitting diode (LED) head 88 that illuminates the photosensitive drum 87 responsive to printing data, a transfer roller 89, a charging roller 90 that charges the surface of the photosensitive drum 87 to a uniform potential, and a developer unit 91. The LED head 88 comprises a printed circuit board on which are mounted a LED array and its driving circuits, and a rod lens array for focusing the light emitted by the LED array onto the photosensitive drum 87. The developer unit 91 comprises a developing roller 92, blade 93, sponge roller 94, mixing shaft 95, and a supply of nonmagnetic, single-component black toner 96. The developing roller 92 is made of a semi-conductive rubber material.

Toner 96 is supplied by the mixing shaft 95 to the sponge roller 94, which transfers a suitable amount to the blade 93. The blade 93 spreads a thin layer of toner 96 on the surface of the developing roller 92. The toner 96 is strongly charged, to a negative potential, by friction between the developing roller 92 and blade 93. Illumination of the photosensitive drum 87 by the LED head 88 produces an electrostatic latent image on the surface of the photosensitive drum 87, which selectively attracts the toner from the developing roller 92 by electrostatic attraction, producing a toner image on the photosensitive drum 87. This image is transferred to the printing medium P by the transfer roller 89, which is positively charged.

The parallel printing section 81 also has a fuser 97 comprising a heat roller 98 and pressure roller 99, which fuse the transferred toner image onto the printing medium P by means of heat and pressure, and feed the printing medium P with the fused image to the transport rollers 10a and 10b of the serial printing section 82.

The serial printing section 82 has the guide shafts 15a 15b and 63, carriage 6, head case 61, projection 61a, photosensor 23, and delivery rollers 11a and 11b that were shown in FIGS. 18 and 20, and operates in substantially the same way as the fifth embodiment. The printing head 5, the guide pins 60a and 60b, and the mechanism for moving the guide shaft 63 have been omitted to simplify the drawing. The printing head 5 need not have a black printing element group 5K. If a black printing element group is present, it is not used.

The paper supply section 83 comprises a cassette 100 that holds a supply of the printing medium P, a hopping roller 101 that turns in the direction of arrow F to feed printing medium P from the cassette 100, a pair of registration rollers 102 and 103 that turn in the direction of arrows G and H to transport the printing medium P to the parallel printing section 81, a photosensor 104 that detects the edge of the printing medium P, and guides 105, 106, 107, 108, and 109 that guide the printing medium P as it is transported by the rollers mentioned above.

Figure 23:
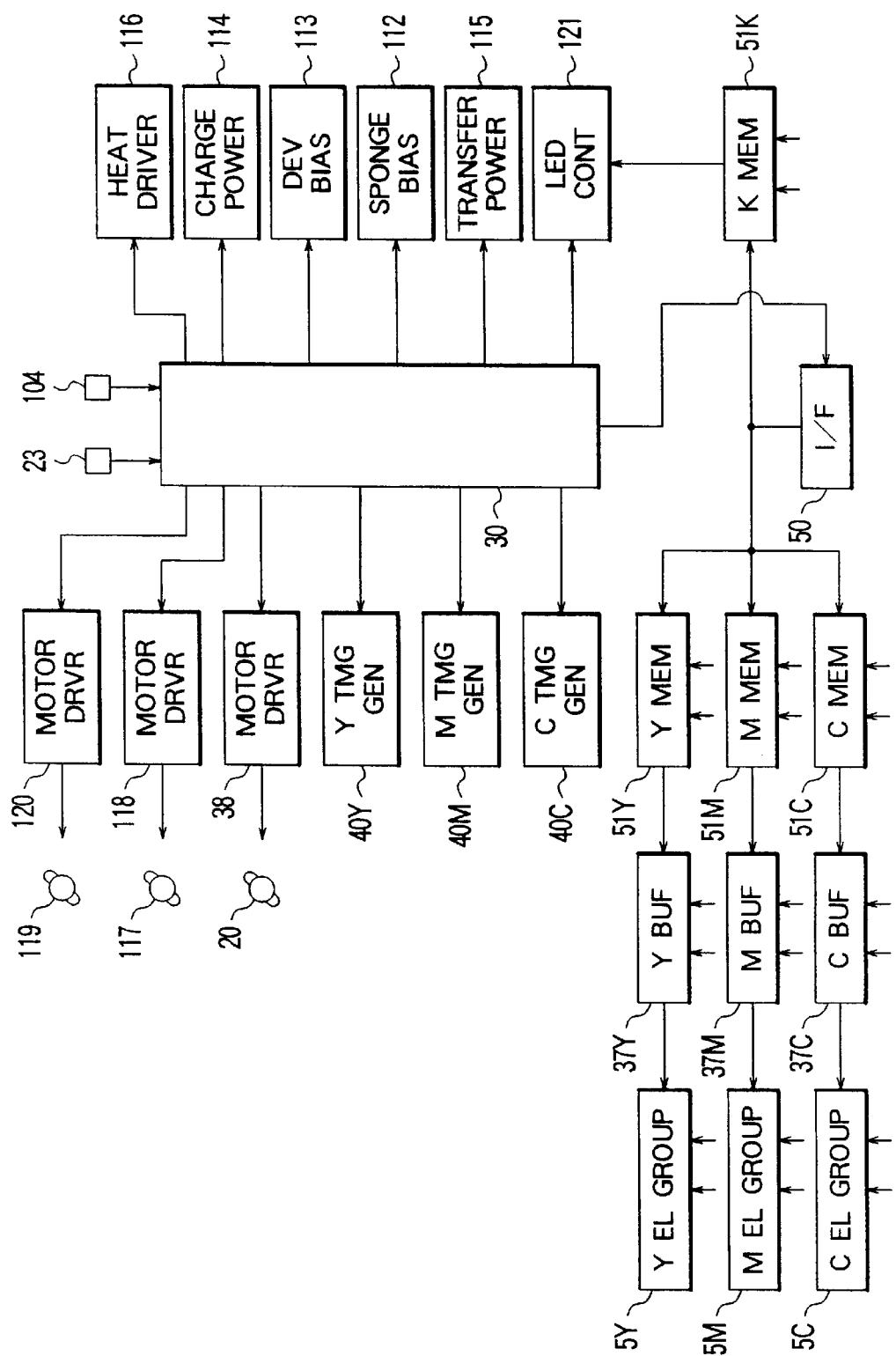
FIG. 23 is a block diagram of the control system of the printer in FIG. 22.

FIG. 23 is a block diagram of the control system of this printer, using the same reference numerals as in FIG. 13 for equivalent elements. Repeated descriptions of these elements will be omitted. The new elements are a bias power source 112 for the sponge roller 94, a bias power source 113 for the developing roller (DEV) 92, a charging power source 114 for the charging roller 90, a power source 115 for the transfer roller 89, a heating-element driver 116 for driving a heating element (not shown) in the heat roller 98 to maintain a temperature necessary for fusing, a roller motor 117 that drives the rollers, shaft, and drum 10a, 10b, 11a, 11b, 87, 89, 90, 92, 94, 95, 98, 102, and 103 shown in FIG. 22, a roller motor driving circuit 118 for controlling the roller motor 117, a hopping motor 119 that drives the hopping roller 101 in FIG. 22, a hopping motor driving circuit 120 for controlling the hopping motor driving circuit 120, and a LED printing controller (CONT) 121 that controls the LED head 88 in FIG. 22. The black printing data stored in the black data memory 51K are supplied to this LED printing controller 121.

The seventh embodiment can operate in several modes.

In a first mode, the serial printing section 82 prints unidirectionally in yellow, magenta, and cyan, and the parallel printing section 81 prints the color black. When data for a page are received in the data memories 51Y, 51M, 51C, and 51K via the interface 50, the controller 30 commands the spacing motor driving circuit 38 to drive the spacing motor 20 so as to move the printing head 5 to its home position, and commands the hopping motor driving circuit 118 to drive the hopping motor 117 so as to feed one sheet of the printing medium P into the space between guides 105 and 106, until the leading edge of the printing medium P reaches the registration rollers 102 and 103.

Next, the controller 30 commands the roller motor driving circuit 120 to turn the registration rollers 102 and 103 and the other rollers, shaft, and drum mentioned above. When the leading edge of the printing medium P reaches photosensor 104, the controller 30 turns on the power sources 112, 113, and 114 that supply voltages to the sponge roller 94, developing roller 92, and charging roller 90.

Next, the controller 30 sends control signals to the black data memory 51K that cause data for the first pixel line on the page to be transferred to the LED printing controller 121. Under control of the controller 30, the LED printing controller 121 converts these data to a suitable form and transfers the converted data to the LED head 88. In the LED array in the LED head 88, light-emitting diodes are turned on in response to the data, illuminating dots on the surface of the photosensitive drum 87, which has been charged to a uniform potential by the charging roller 90, thus forming an electrostatic latent image of one pixel line all at once. As the photosensitive drum 87 turns, this procedure is repeated for the second and subsequent pixel lines, to build up a latent image of the entire page. This image is developed by the transfer of toner 96 from the developing roller 92.

When the leading edge of the paper reaches the space between the photosensitive drum 87 and transfer roller 89, the controller 30 turns on the power source 115 that supplies a high voltage to the transfer roller 89. As the photosensitive drum 87 continues to turn, the toner image is transferred to the printing medium P by electrostatic attraction. When the entire black toner image has been transferred, the controller 30 turns off the power sources 112, 113, 114, and 115.

As the printing medium P carrying the black toner image is transported between the heat roller 98 and pressure roller 99 in the fuser 97, the toner image is fused. From the fuser 97, the printing medium P passes along guide 108 to the transport rollers 10a and 10b of the serial printing section 82. The remaining colors (yellow, magenta, cyan) are then printed by the printing head 5, on top of the black image. Other than the omission of the color black, the serial printing section 82 operates in the unidirectional mode described in the fifth embodiment, the head case 61 and printing head 5 moving at an acute angle to the direction of travel (arrow A) of the printing medium P, so a detailed explanation will be omitted.

The color image printed by the serial printing section 82 must be correctly aligned with the black image printed by the parallel printing section 81, so that the first pixel lines of the two images are printed in the same position on the printing medium P. The necessary alignment is achieved by proper control of the spacing motor 20 and roller motor 117. If these motors are stepping motors, the necessary control can be carried out with high accuracy by counting steps. In any case, the timing control is simplified in that the printing medium P is transported in both the parallel printing section 81 and serial printing section 82 by rollers driven by the same motor 117.

The printing medium P is transported at a uniform rate throughout the black and color printing processes performed by the parallel printing section 81 and serial printing section 82, so motion irregularities are substantially absent and the printed page is free of seams and density variations. The color black is printed with particularly high quality, since the parallel printing process does not involve any transverse scanning motion. The resulting improvement in printing quality is especially noticeable in printing on overhead projector (OHP) media, or on thick paper media such as envelopes and post cards, which can be transported most successfully at a constant, uniform rate.

In a second mode, the parallel printing section 81 prints the color black, and the serial printing section 82 does not operate. This mode is useful for printing pages of text. The spacing motor 20 need not be driven, and the printing head 5 can remain at its home position. The roller motor 117 can be driven at a higher speed than in the first mode, taking advantage of the higher maximum printing speed of the parallel printing section 81. Since much printing is done in the color black alone, the overall result is a considerable gain in average printing speed.

In a third mode, the serial printing section 82 prints the colors yellow, magenta, and cyan bidirectionally, and the parallel printing section 81 does not operate. The motor 117 is controlled so that the printing medium P is held stationary during the transverse printing scans, and is transported while the printing head 5 is at its home position or stopping position. This mode is useful for printing text in colors other than black. Pages of red text, for example, can be printed more quickly in this mode than in the first mode.

If the serial printing section 82 has a rack-and-pinion mechanism as illustrated in FIG. 20, then in the first mode, the guide shaft 63 can be moved to different positions according to the width of the printing medium P, or according to left and right margin settings, and printing can be speeded up as explained in the fifth embodiment.

Although the seventh embodiment has been described in relation to a printer, the same combined use of serial and parallel printing is also possible in a copier. In this case it is desirable for the serial printing section to have a rack-and-pinion mechanism, and for the guide shaft 63 to be positioned according to the width of the subject copy.

The invention is not limited to the embodiments described above; these embodiments can be varied in many ways. The number of scanning elements and printing elements in each group is not limited to sixteen; it may be any number. (Serial scanning and printing heads that scan or print sixty-four or one hundred twenty-eight lines at a time are in common use.) The different element groups need not be spaced at equal intervals of Wp as shown in the drawings; the intervals may be unequal. Within each element group, the scanning or printing elements need not be disposed in a straight column as shown in the drawings, but can be disposed in a zig-zag arrangement, for example, or any other suitable arrangement. The colors scanned and printed are not limited to the colors named above. In a copier, the scanning head and printing head need not share the same carriage; separate carriages can be employed, although a shared carriage is preferred.

No restriction is placed on the structure of the printing head. The invention can be practiced in a copier or printer employing a serial printing head of the thermal type or dot-matrix impact type, for example. There may also be more than one serial printing head, adapted to print with different types of ink giving different degrees of color darkness or density. The printing head may be permanently attached to the carriage, or may be removably attached to permit ink replacement.

In the seventh embodiment, the parallel printing section can employ any printing method that prints an entire pixel line at a time on the printing medium P. Two well-known alternatives to the LED printing method described above are laser printing and parallel thermal printing.

Also with regard to the seventh embodiment, it is not necessary for the parallel printing section to precede the serial printing section. Serial printing can be performed first, an arrangement which is advantageous when serial and parallel printing are combined in a copier.

Those skilled in the art will recognized that other variations are also possible within the scope claimed below.

What is claimed is:

1. A copier having a scanning head with a plurality of scanning elements, for scanning an image from a first medium, and a printing head with a plurality of printing elements, for printing a copy of said image on a second medium, comprising:

a first transport mechanism for producing a uniform relative motion between said scanning head and said first medium in a first scanning direction, and producing a uniform relative motion between said printing head and said second medium in a first printing direction; and a second transport mechanism for moving said scanning head in a second scanning direction aligned at an acute angle to said first scanning direction, at a rate that causes each scanning element in said scanning head to scan a pixel line perpendicular to said first scanning direction on said first medium, and moving said printing head in a second printing direction aligned at an acute angle to said first printing direction, at a rate that causes each printing element in said printing head to print a pixel line perpendicular to said first printing direction on said second medium;

wherein said scanning elements are organized into a plurality of scanning element groups having equal numbers of scanning elements, these scanning element groups being disposed side-by-side, the scanning elements in different scanning element groups scanning different colors, and corresponding scanning elements in different scanning element groups being aligned in straight lines perpendicular to said first scanning direction; and wherein said printing elements are organized into a plurality of printing element groups having equal numbers of printing elements, these printing elements being disposed side by side, the printing elements in different groups printing different colors, and corresponding printing elements in different printing element groups being aligned in straight lines perpendicular to said first printing direction.

2. The copier of claim 1, wherein said scanning head and said printing head are disposed between said first medium and said second medium.

3. The copier of claim 1, wherein said first transport mechanism moves said scanning head and said printing head while said first medium and said second medium remain stationary.

4. The copier of claim 3, wherein said first scanning direction is parallel to said first printing direction, said second scanning direction is parallel to said second printing direction, and said second transport mechanism comprises:
   a carriage supporting said scanning head and said printing head;
   a head guide mechanism for moving said carriage in said second scanning direction; and
   a head-guide transport mechanism for moving said head-guide mechanism and said carriage in said first scanning direction.

5. The copier of claim 1, wherein said first transport mechanism moves said first medium in said first scanning direction, and moves and said second medium in said first printing direction.

6. The copier of claim 5, wherein said first scanning direction is parallel to said first printing direction, said second scanning direction is parallel to said second printing direction, and said second transport mechanism comprises:
   a shaft aligned in said second scanning direction;
   a carriage, slidably mounted on said shaft, for supporting said scanning head and said printing head; and
   a motor for moving said carriage back and forth on said shaft.

7. The copier of claim 5, wherein said first scanning direction is parallel to said first printing direction, said second scanning direction is parallel to said second printing direction, and said second transport mechanism comprises:
   a first shaft aligned perpendicular to said first scanning direction;
   a carriage, slidably mounted on said first shaft;
   a second shaft aligned in said second scanning direction;
   a pair of pins attached to said carriage and slidably supporting said scanning head and said printing head;
   a pair of springs mounted on the respective pins, for pushing said scanning head and said printing head toward said second shaft; and
   a motor for moving said carriage back and forth on said first shaft.

8. The copier of claim 7, wherein said second shaft is rotatably supported at one end, and said second transport mechanism also comprises:
   a shaft moving mechanism coupled to another end of said second shaft, for moving said second shaft between a first position in which said second shaft is aligned perpendicular to said first direction, and a second position in which said second shaft is aligned in said second direction.

9. The copier of claim 8, wherein:
   said copier scans and prints in a bidirectional mode when said second shaft is at said first position; and
   said copier scans and prints in a unidirectional mode when said second shaft is at said second position.

10. The copier of claim 8, wherein said shaft moving mechanism comprises a lever and solenoid.

11. The copier of claim 8, wherein said shaft moving mechanism comprises a rack and pinion.

12. The copier of claim 11, wherein said shaft moving mechanism can adjust said second position, thereby adjusting said second scanning direction, and said first transport mechanism moves said first medium in said first scanning direction and said second medium in said first printing direction at a speed responsive to an angle between said first scanning direction and said second scanning direction.

13. The copier of claim 1, further comprising a parallel printing section for printing in a particular color on said second medium a pixel line at a time, wherein said printing head prints in at least one color other than said particular color on said second medium.

14. The copier of claim 13, wherein said particular color is black.

15. The copier of claim 1, wherein:
   each scanning element group has a certain first number N of scanning elements;
   said second transport mechanism moves said scanning head cyclically back and forth between a home position on one side of said first medium and a stopping position on an opposite side of said first medium;
   each cycle of motion of said scanning head, beginning and ending at said home position, has a first duration Tp;
   while traveling across said first medium from said home position to said stopping position, each scanning element in said scanning head scans said image during an interval of a second duration Tw, during which interval said scanning head moves in said first scanning direction by a distance equivalent to a certain second number $\Delta D$ of pixel lines; and
   said second duration Tw is equal to said first duration Tp multiplied by said second number $\Delta D$ and divided by said first number N.

16. The copier of claim 1, wherein:
   each printing element group has a certain first number N of printing elements;
   the printing elements in each printing element group are divided into a first subgroup, a second subgroup, a third subgroup, and a fourth subgroup, these subgroups being disposed in order from said first subgroup to said fourth subgroup in said first direction;

said second transport mechanism moves said printing head cyclically back and forth between a home position on one side of said second medium to a stopping position on an opposite side of said second medium;

each cycle of motion of said printing head, beginning and ending at said home position, has a first duration Tp;

consecutive cycles of motion of said printing head are consecutively numbered;

the printing elements in said first subgroup and said third subgroup print in even-numbered cycles of motion of said printing head;

the printing elements in said second subgroup and said fourth subgroup print in odd-numbered cycles of motion of said printing head;

while traveling across said medium from said home position to said stopping position, each printing element in said printing head prints during an interval of a second duration Tw, during which interval said printing head moves in said first direction by a distance equivalent to a certain second number ΔD of pixel lines; and said second duration Tw is equal to twice said first duration Tp multiplied by said second number ΔD and divided by said first number N.

17. A scanner having a scanning head with a plurality of scanning elements, for scanning an image from a medium, comprising:

a first transport mechanism for producing a uniform relative motion between said scanning head and said medium in a first direction; and a second transport mechanism for moving said scanning head in a second direction aligned at an acute angle to said first direction, at a rate that causes each scanning element in said scanning head to scan a pixel line perpendicular to said first direction on said medium;

wherein said scanning elements are organized into a plurality of scanning element groups having equal numbers of scanning elements, said scanning element groups being disposed side-by-side, the scanning elements in different scanning element groups scanning different colors, and corresponding scanning elements in different scanning element groups being aligned in straight lines perpendicular to said first direction.

18. The scanner of claim 17, wherein said first transport mechanism moves said scanning head while said medium remains stationary.

19. The scanner of claim 18, wherein said second transport mechanism comprises:

a carriage supporting said scanning head;

a head guide mechanism for moving said carriage in said second direction; and a head-guide transport mechanism for moving said head-guide mechanism and said carriage in said first direction.

20. The scanner of claim 17, wherein said second transport mechanism moves said medium in said first direction.

21. The scanner of claim 20, wherein said head transport mechanism comprises:

a shaft aligned in said second direction;

a carriage, slidably mounted on said shaft, for supporting said scanning head; and a motor for moving said carriage back and forth on said shaft.

22. The scanner of claim 20, wherein said second transport mechanism comprises:

a first shaft aligned perpendicular to said first direction;

a carriage, slidably mounted on said first shaft;

a second shaft aligned in said second direction;

a pair of pins attached to said carriage and slidably supporting said scanning head;

a pair of springs mounted on respective pins, for pushing said scanning head toward said second shaft; and a motor for moving said carriage back and forth on said first shaft.

23. The scanner of claim 22, wherein said second shaft is rotatably supported at one end, and said second transport mechanism also comprises:

a shaft moving mechanism coupled to another end of said second shaft, for moving said second shaft between a first position in which said second shaft is aligned perpendicular to said first direction, and a second position in which said second shaft is aligned in said second direction.

24. The scanner of claim 23 wherein:

said scanner scans in a bidirectional mode when said second shaft is at said first position; and said scanner scans in a unidirectional mode when said second shaft is at said second position.

25. The scanner of claim 23, wherein said shaft moving mechanism comprises a lever and solenoid.

26. The scanner of claim 23, wherein said shaft moving mechanism comprises a rack and pinion.

27. The scanner of claim 26, wherein said shaft moving mechanism can adjust said second position, thereby adjusting said second direction, and said first transport mechanism moves said medium in said first direction at a speed responsive to an angle between said first direction and said second direction.

28. The scanner of claim 17, wherein:

each scanning element group has a certain first number N of scanning elements;

said second transport mechanism moves said scanning head cyclically back and forth between a home position on one side of said medium and a stopping position on an opposite side of said medium, each cycle having a first duration Tp;

while traveling across said medium from said home position to said stopping position, each scanning element in said scanning head scans said image during an interval of a second duration Tw, during which interval said scanning head moves in said first direction by a distance equivalent to a certain second number ΔD of pixel lines; and said second duration Tw is equal to said first duration Tp multiplied by said second number ΔD and divided by said first number N.

29. A printer having a printing head with a plurality of printing elements, for printing on a medium, comprising:

a first transport mechanism for producing a uniform relative motion between said printing head and said medium in a first direction; and a second transport mechanism for moving said printing head in a second direction aligned at an acute angle to said first direction at a rate that causes each printing element in said printing head to print a pixel line perpendicular to said first direction on said medium; wherein said printing elements are organized into a plurality of printing element groups having equal numbers of printing elements, said printing element groups being disposed side by side, the printing elements in different printing element groups printing different colors, and corresponding printing elements in different printing element groups being aligned in straight lines perpendicular to said first direction.

30. The printer of claim 29, wherein said first transport mechanism moves said printing head while said medium remains stationary, and wherein said second transport mechanism comprises;

a carriage supporting said printing head;

a head guide mechanism for moving said carriage in said second direction; and a head-guide transport mechanism for moving said head-guide mechanism and said carriage in said first direction.

31. The printer of claim 29, wherein said second transport mechanism moves said medium in said first direction.

32. The printer of claim 31, wherein said second transport mechanism comprises:

a shaft aligned in said second direction;

a carriage, slidably mounted on said shaft, for supporting said printing head; and a motor for moving said carriage back and forth on said shaft.

33. The printer of claim 31, wherein said second transport mechanism comprises:

a first shaft aligned perpendicular to said first direction;

a carriage, slidably mounted on said first shaft;

a second shaft aligned in said second direction;

a pair of pins attached to said carriage and slidably supporting said printing head;

a pair of springs mounted on respective pins, for pushing said printing head toward said second shaft; and a motor for moving said carriage back and forth on said first shaft.

34. The printer of claim 33, wherein said second shaft is rotatably supported at one end, and said second transport mechanism also comprises:

a shaft moving mechanism coupled to another end of said second shaft, for moving said second shaft between a first position in which said second shaft is aligned perpendicular to said first direction, and a second position in which said second shaft is aligned in said second direction.

35. The printer of claim 34, wherein:

said printer prints in a bidirectional mode when said second shaft is at said first position; and said printer prints in a unidirectional mode when said second shaft is at said second position.

36. The printer of claim 34, wherein said shaft moving mechanism comprises a lever and solenoid.

37. The printer of claim 34, wherein said shaft moving mechanism comprises a rack and pinion.

38. The printer of claim 37, wherein said shaft moving mechanism can adjust said second position, thereby adjusting said second direction, responsive to a width of a printing area on said medium, and said first transport mechanism moves said medium in said first direction at a speed responsive to an angle between said first direction and said second direction.

39. The printer of claim 38, further comprising a parallel printing section for printing in a particular color on said medium a pixel line at a time, wherein said printing head prints in at least one color other than said particular color on said medium.

40. The printer of claim 39, wherein said parallel printing section comprises an electrophotographic printing apparatus.

41. The printer of claim 40, wherein said particular color is black.

42. The printer of claim 29, wherein:

each printing element group has a certain first number N of printing elements;

said second transport mechanism moves said printing head cyclically back and forth between a home position on one side of said medium and a stopping position on an opposite side of said medium;

each cycle of motion of said printing head, beginning and ending at said home position, has a first duration Tp;

while traveling across said medium from said home position to said stopping position, each printing element in said printing head prints during an interval of a second duration Tw, during which interval said printing head moves in said first direction by a distance equivalent to a certain second number $\Delta D$ of pixel lines; and said second duration Tw is equal to said first duration Tp multiplied by said second number $\Delta D$ and divided by said first number N.

43. The printer of claim 29, wherein:

each group of printing elements has a certain first number N of printing elements;

the printing elements in each group of printing elements are divided into a first subgroup, a second subgroup, a third subgroup, and a fourth subgroup, these subgroups being disposed in order from said first subgroup to said fourth subgroup in said first direction;

said second transport mechanism moves said printing head cyclically back and forth between a home position on one side of said medium to a stopping position on an opposite side of said medium;

each cycle of motion of said printing head, beginning and ending at said home position, has a first duration Tp;

consecutive cycles of motion of said printing head are consecutively numbered;

the printing elements in said first subgroup and said third subgroup print in even-numbered cycles of motion of said printing head;

the printing elements in said second subgroup and said fourth subgroup print in odd-numbered cycles of motion of said printing head;

while traveling across said medium from said home position to said stopping position, each printing element in said printing head prints during an interval of a second duration Tw, during which interval said printing head moves in said first direction by a distance equivalent to a certain second number $\Delta D$ of pixel lines; and said second duration Tw is equal to twice said first duration Tp multiplied by said second number $\Delta D$ and divided by said first number N.

* * * * *